(12) United States Patent
Okuno et al.

(10) Patent No.: US 7,690,401 B2
(45) Date of Patent: Apr. 6, 2010

(54) HIGH-DENSITY HOLLOW WEAVE GROUND FABRIC

(75) Inventors: Tokio Okuno, Suita (JP); Miyoko Kojima, Kanazawa (JP)

(73) Assignee: Asahi Kasei Chemicals Corporation, Tokyo (JP)

(*) Notice: Subject to any disclaimer, the term of this patent is extended or adjusted under 35 U.S.C. 154(b) by 1043 days.

(21) Appl. No.: 10/573,893

(22) PCT Filed: Sep. 29, 2004

(86) PCT No.: PCT/JP2004/014267
§ 371 (c)(1),
(2), (4) Date: Mar. 29, 2006

(87) PCT Pub. No.: WO2005/031052
PCT Pub. Date: Apr. 7, 2005

(65) Prior Publication Data
US 2007/0007756 A1    Jan. 11, 2007

(30) Foreign Application Priority Data
Sep. 29, 2003  (JP) .............................. 2003-337659

(51) Int. Cl.
*D03D 3/00*    (2006.01)
(52) U.S. Cl. .................................. 139/384 R
(58) Field of Classification Search ............. 139/383 R, 139/384 R, 387 R, 389; 280/728.1, 730.1, 280/730.2; 428/34.1, 34.3, 34.7, 36.1, 36.4, 428/36.91, 98, 102, 192, 193; 383/3
See application file for complete search history.

(56) References Cited

U.S. PATENT DOCUMENTS

| | | | | |
|---|---|---|---|---|
| 6,328,334 B1* | 12/2001 | Kanuma | .................. | 280/730.2 |
| 6,488,311 B2* | 12/2002 | Kato et al. | ............... | 280/743.1 |
| 7,077,424 B2* | 7/2006 | Inoue | ...................... | 280/730.2 |
| 7,424,899 B2* | 9/2008 | Mouri et al. | ............ | 139/384 R |
| 2002/0130503 A1 | 9/2002 | Matsui | | |
| 2008/0042414 A1* | 2/2008 | Nagaoka | .................. | 280/743.1 |

FOREIGN PATENT DOCUMENTS

| | | |
|---|---|---|
| JP | 2001-233153 | 8/2001 |
| JP | 2002316610 A | 10/2002 |
| JP | 2002321585 A | 11/2002 |

(Continued)

*Primary Examiner*—Arti Singh-Pandey
(74) *Attorney, Agent, or Firm*—Finnegan, Henderson, Farabow, Garrett & Dunner, L.L.P.

(57) ABSTRACT

A high-density hollow weave fabric for an air bag is provided, wherein an inflatable double-layer hollow weave portion is encircled on the outer periphery thereof with a seam zone including a reversible figured weave pattern and a basket weave pattern. In the seam zone, the reversible figured weave pattern is closest to the boundary of the inflatable double-layer hollow weave portion, and a first weave portion including the basket weave pattern, a narrow width hollow weave portion and a second basket weave patterns continue in this order. The inventive fabric is woven without the generation of fluffs and wrinkles, and the wrinkle-free coating is provided in the boundary between the double-layer hollow weave portion and the seam zone encircling the former. By using this high-density hollow weave fabric, it is possible to make the curtain-shaped air bag deployable at a high speed while preventing gas from leaking.

16 Claims, 6 Drawing Sheets

FOREIGN PATENT DOCUMENTS

| | | |
|---|---|---|
| JP | 2003-48505 | 2/2003 |
| JP | 2003048505 | 2/2003 |
| JP | 2003-510469 | 3/2003 |
| JP | 2003-267176 | 9/2003 |
| WO | WO 01/21870 A1 | 3/2001 |
| WO | WO 02/061200 A1 | 8/2002 |
| WO | WO 03/078711 A1 | 9/2003 |

* cited by examiner

HIGH-DENSITY HOLLOW WEAVE GROUND FABRIC

TECHNICAL FIELD

The present invention relates to a high-density hollow weave fabric suitably used for an air bag that is one of the safety devices in a vehicle such as an automobile. Particularly, the invention relates to a high-density hollow weave fabric for a side curtain air bag, having a complicated configuration, for the side protection of a passenger when a vehicle is impacted in the lateral direction.

BACKGROUND ART

Recently, it has been required that the safety of a passenger, upon a collision, is improved. The mounting rate of various air bags has, thus, increased. An air bag is an inflatable cushion which is rapidly deployed and inflated, with gas flowing from an inflator into the inflatable cushion, when a sensor detects an impact upon a head-on collision or lateral collision of a vehicle, so that the impact applied to the passenger is mitigated to protect a human body due to the cushioning action of the inflated bag.

The air bag was initially applied to a driver's seat, then to an assistant's seat, particularly at a position on a front side thereof, mainly for the purpose of protecting a face and/or an upper half of the body of a passenger upon the head-on collision of the automobile. Recently, a curtain-shaped air bag has been developed, capable of coping with a lateral collision or a roll-over collision of the vehicle.

The curtain-shaped air bag is accommodated in an area from a front pillar side to a rear pillar side along a roof rail of a compartment side wall and is designed to inflate/deploy along a side window upon collision, wherein inflatable bag portions are formed at a plurality of positions. The curtain-shaped air bag is required to be excellent in containment ability (capable of being compactly folded) and it has a high inflation/deployment speed upon the collision since it must instantaneously appear between the passenger's head and a glass window to protect the head. Also, a required characteristic is that the internal pressure of the inflated air bag is not reduced in a short time but is maintained at a suitable level for several seconds after the deployment as a countermeasure against a roll-over collision. As the curtain-shaped air bag has a complicated configuration, it is often woven by a loom capable of weaving a high-density hollow weave fabric although it may be manufactured by a sewing operation. The air bag thus woven must be free from burst air-leakage problems upon inflation. The woven high-density double weave fabric consists of inflatable double layer portions and a single layer portion separating the double layer portions from each other. In the prior art, a boundary between the double layer portion and the single layer portion has often been problematic due to its weave structure in that fluffs appear on the high-density hollow weave fabric or the mechanical strength of the fabric is lowered by the generation of wrinkles.

When the curtain-shaped air bag is manufactured by a sewing operation, as in the prior art, a plurality of fabric sheets are prepared by cutting and are then sewn together. In this case, a sealant is sandwiched between the fabric sheets to be sewn together to prevent air from leaking through stitches as well as a thick sewing needle is used for the purpose of obtaining the anti-burst property. This, however, results in a problem in that the containment ability becomes worse. Also, as the configuration of the air bag is complicated, the sewing operation is troublesome.

Japanese Unexamined Patent Publication No. 1-254446 (Kokai) discloses that a bag-shaped high-density woven fabric wherein the outer periphery of a hollow weave portion is closed with a single-layer weave portion is used as an air bag. While it is necessary to use a single-layer weave portion larger in width to maintain the inflated state of the hollow weave portion, and there is a problem in that wrinkles or fluffs generate in a boundary between the hollow weave portion and the single-layer weave portion since a crimpability of a yarn in the single-layer weave portion is larger than that of a yarn in the hollow weave portion and also a cover factor of the fabric is larger, it is impossible to suppress air leakage for several seconds after inflation and deployment. Particularly, there is a problem in that wrinkles are liable to be generated due to heat or tension applied to the fabric when the surface of the fabric is coated with silicone resin or urethane resin to be suitable for the air bag.

Japanese Unexamined Patent Publications (Kokai) No. 3-16852 and No. 4-193646 propose a method wherein a seam zone is formed by encircling the outer periphery of a circular double-layer hollow weave portion with a single-layer weave portion consisting of two kinds of weave patterns to strengthen the seam zone. However, there is a problem in that, while the strength of the seamed portion itself is improved, it is still impossible to prevent air from leaking through the boundary between the double-layer hollow weave portion and the single-layer weave portion.

Japanese Unexamined Patent Publication (Kokai) No. 3-16850 proposes a method wherein the outer periphery of a circular double-layer hollow weave portion is encircled by two single-layer weave portions to form a seam zone and strengthen a seamed portion. However, there is no concrete description of a weave pattern of the single-layer weave portion therein and, as the width of the single-layer weave portion is too large, if such a fabric is used as a curtain-shaped air bag, there is a problem that warp yarns may be fluffy and the fabric may be wrinkled during coating.

Japanese Unexamined Patent Publication (Kohyo) No. 2003-510469 proposes a method wherein a plurality of single-layer portions of a basket weave pattern are formed around the outer periphery of a double-layer hollow weave portion to reduce the yarn shifting. However, this is problematic because the weave pattern in the single-layer portion is solely a 2/2 basket weave (throughout the specification, the term basket weave is used as the representing therm for basket weave including small-repeat basket weave such as hopsack weave, mat weave monk's weave and the like.) and the influence of a fineness of a yarn on the resulted fabric is not at all taken into account. As the 2/2 basket weave pattern has a tight structure and a load applied to a yarn is large, if a plurality of such weave patterns are adjacently arranged, there is a problem in that wrinkles are generated in a boundary between the double-layer hollow weave portion and the singe-layer weave portion to increase a bulkiness of the fabric, which deteriorates the containment ability. Also, the air leakage becomes high due to the irregularity of coating caused by the wrinkles.

Japanese Unexamined Patent Publication (Kokai) No. 2003-267176 proposes a method wherein a reversible hollow weave (reversible figured weave) portion is provided adjacent to a double-layer hollow weave portion to ensure air-tightness. However, there is no description in that a plurality of kinds of basket weave patterns are used for a single-layer weave portion arranged on the outer periphery of the reversible hollow weave portion. Accordingly, the air leakage is still unsatisfactory.

FIG. 7 is a schematic cross-sectional view of a conventional woven fabric of the above-mentioned type in the vicinity of a seam zone, and FIG. 8 illustrates a weave pattern of this fabric.

In the prior art, as shown in FIG. 7, two 2/2 basket weave portions are arranged in parallel with each other to form a seam zone. The 2/2 basket weave pattern has a tight structure and is effective for reducing the air leakage because the yarns cannot be shifted upon the deployment or inflation. However, in the high-density hollow weave fabric, if any such tight weave pattern like 2/2 basket weave is placed further outside thereof, wrinkles are generated in a bag portion interposed between the 2/2 basket weave portions or in the exterior of the 2/2 basket weave portion to cause irregular coating, resulting in air leakage.

As mentioned above, a high-density hollow weave fabric has not been obtained which is free from the generation of fluffs or wrinkles and solves the weavability and the air-leakage problems.

DISCLOSURE OF THE INVENTION

1. Problems to be Solved by the Invention

An object of the present invention is to solve the above-mentioned problems in the prior art by providing a high-density hollow weave fabric suitable for a curtain-shaped air bag which is rapidly inflatable or deployable with extremely little air leakage, is free from fluffs of warp yarn because the tension applied to the warp yarn during the weaving operation is small, hardly generates wrinkles in a boundary between a double-layer hollow weave portion and a single-layer weave portion during coating, is excellent in fabric quality and high in air-holding ratio after inflation and deployment.

2. Means for Solving the Problem

To solve the above-mentioned problem, the inventors of the present invention have diligently studied to select suitable weave patterns and combinations thereof constituting a seam zone as well as a favorable width of a single-layer weave portion, and found that the above-mentioned object is achievable by providing a seam zone having a specified weave pattern on the outer periphery of the hollow weave air bag. Thus, the present invention has been completed.

That is, the object of the present invention is achievable by a high-density hollow weave fabric according to the following inventions:

(1) A high-density hollow weave fabric comprising a deployable/inflatable double-layer bag portion, a seam zone provided on the outer periphery of the bag portion, and a non-deployable/inflatable portion, which portions are formed of thermoplastic synthetic fiber yarns of a yarn size in a range from 100 dtex to 500 dtex, wherein at least part of the seam zone comprises a first weave portion including a 2/2 basket weave pattern, a narrow width hollow weave portion and a second weave portion of a 3/3 basket weave pattern in this order as seen from the bag portion side, and the high-density hollow weave fabric has a silicone resin coating of 10 g/m² or more.

(2) A high-density hollow weave fabric as defined by claim 1, wherein the first weave portion is constituted by at least one reversible figured weave pattern and a 2/2 basket weave pattern.

(3) A high-density hollow weave fabric as defined by claim 1 or 2, wherein a cover factor of the narrow width hollow weave portion is in a range from 1,900 to 2,400 per one surface, and the number of yarns is in a range from 20 ends to 40 ends.

(4) A high-density hollow weave fabric as defined by any one of claims 1 and 3, wherein the number of yarns of the 2/2 basket weave pattern is in a range from 4 ends to 16 ends.

(5) A high-density hollow weave fabric as defined by any one of claims 1 and 4, wherein the number of yarns of the 3/3 basket weave pattern is in a range from 3 ends to 15 ends.

(6) A high-density hollow weave fabric as defined by any one of claims 1 and 5, wherein a fineness of the thermoplastic synthetic fiber yarn is 400 dtex or less.

(7) A high-density hollow weave fabric as defined by any one of claims 1 and 6, wherein a fineness of the thermoplastic synthetic fiber yarn is 250 dtex or less.

(8) A high-density hollow weave fabric as defined by any one of claims 1 and 7, wherein the thermoplastic synthetic fiber yarn is a filament yarn of polyhexamethylene adipamide.

(9) A high-density hollow weave fabric as defined by any one of claims 1 and 8, wherein the first weave portion comprises a series of 2 to 6 reversible figured weave patterns.

(10) A high-density hollow weave fabric as defined by any one of claims 1 and 9, wherein at least part of the non-inflatable hollow weave portion has partially knotted points.

(11) A high-density hollow weave fabric as defined by any one of claims 1 and 10, wherein the high-density hollow weave fabric has a silicone coating layer of 140 g/m² or less.

(12) A high-density hollow weave fabric as defined by any one of claims 1 and 11, wherein a fiber fineness of the synthetic fiber is in a range from 0.5 dtex to 4.5 dtex.

(13) A high-density hollow weave fabric as defined by any one of claims 1 and 12, wherein the high-density hollow weave fabric has a silicone coating layer of 50 g/m² or less.

(14) A curtain-shaped air bag formed of a high-density hollow weave fabric as defined by any one of claims 1 to 13.

(15) A curtain-shaped air bag formed of polyhexamethylene adipamide fiber and coated with silicone resin of 10 g/m² to 140 g/m², wherein the retention ratio of the internal pressure after inflation is 70% or more.

(16) A curtain-shaped air bag as defined by claim 14, wherein the air bag is coated with silicone resin at 50 g/m² or less and has the seam zone of the reversible figured weave pattern and the basket weave pattern.

Figure 1:
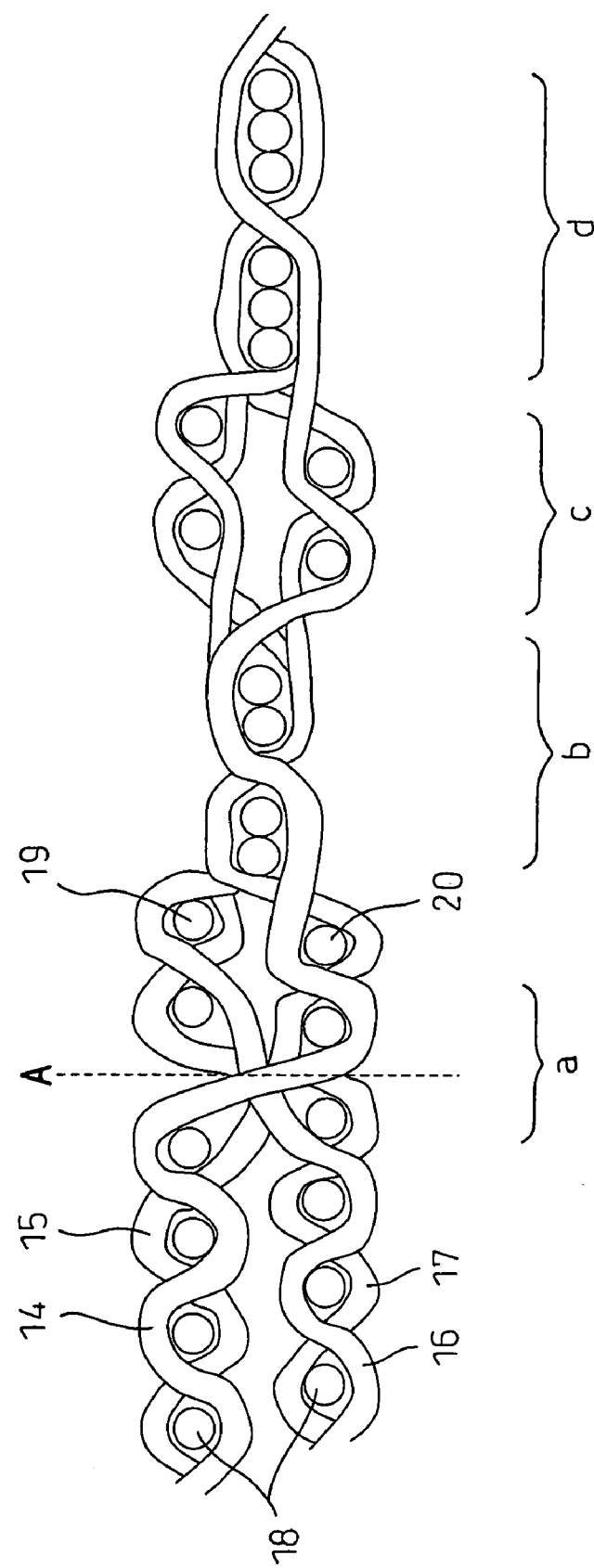
FIG. 1 is a schematic cross-sectional view of part of one embodiment according to the inventive fabric in the vicinity of a seam zone.

In these drawings, the reference numerals denote the following parts, respectively:

1—a high-density hollow weave fabric
2—a seam zone
3—a deployable/inflatable hollow weave portion
5—a fluid introduction port 6—partially knotted portion
7 to 20—yarns
A—a boundary
a—one reversible figured weave portion
b—a 2/2 basket weave portion
c, c'—a narrow width hollow weave portion
d—a 3/3 basket weave portion

BEST MODE FOR CARRYING OUT THE INVENTION

The present invention will be described below.

The inventive high-density hollow weave fabric has a deployable/inflatable double-layer hollow weave portion and a seam zone formed on the outer periphery of the hollow weave portion, wherein the seam zone is formed of at least a 2/2 basket weave portion, a narrow hollow weave portion and a 3/3 basket weave portion.

Figure 3:
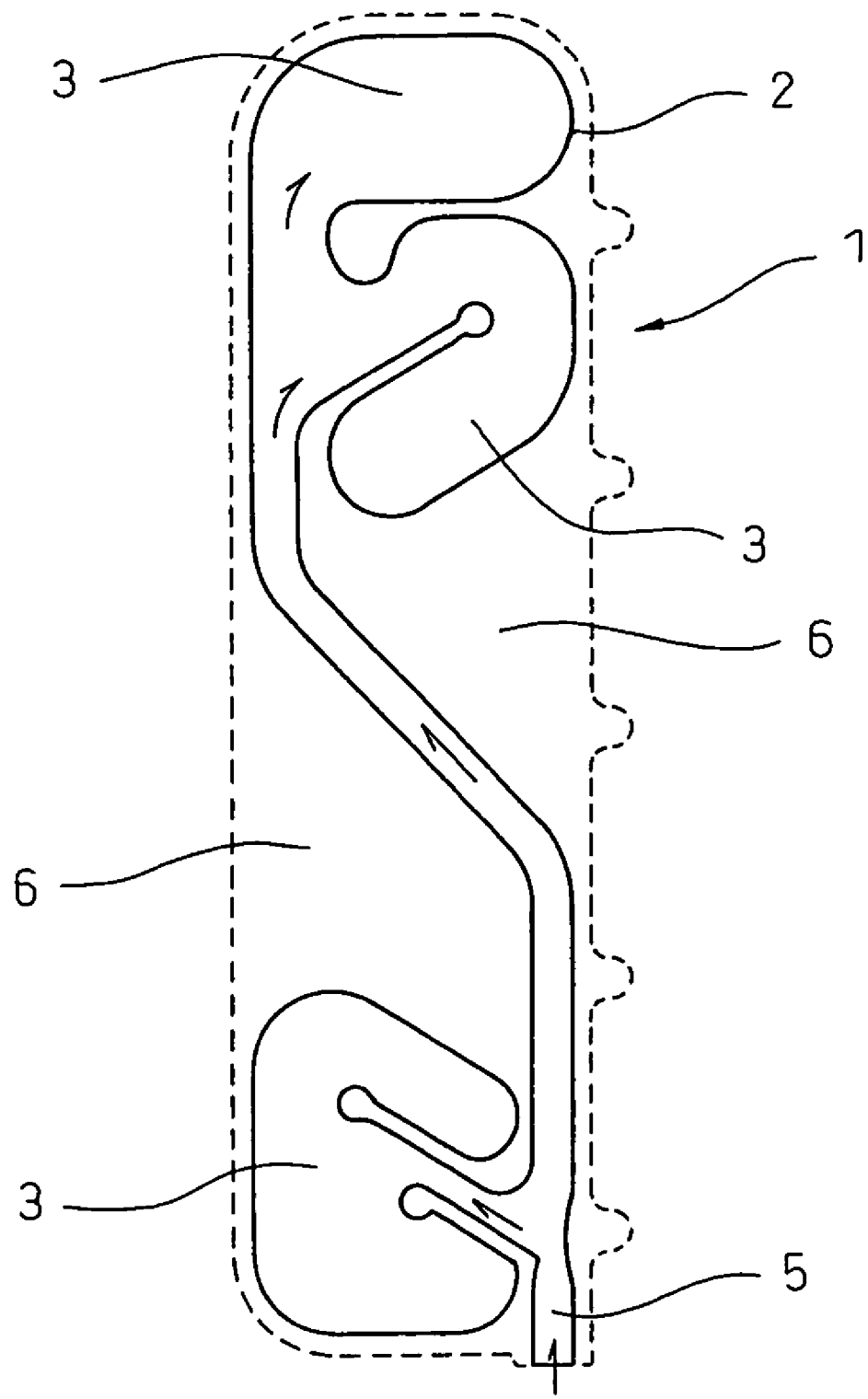
FIG. 3 illustrates a plan view of the inventive high-density hollow weave fabric for a curtain-shaped air bag.
Figure 4:
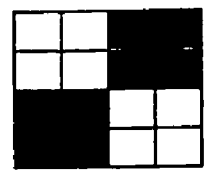
FIG. 4 illustrates a 2/2 basket weave pattern.
Figure 5:
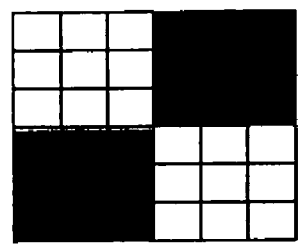
FIG. 5 illustrates a 3/3 basket weave pattern.
Figure 6:
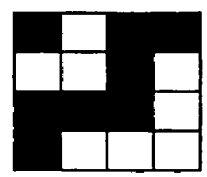
FIG. 6 illustrates a double-layer hollow weave pattern.

FIG. 3 illustrates a plan view of one embodiment of the inventive high-density hollow weave fabric for a curtain-shaped air bag. In FIG. 3, the air bag hollow weave fabric 1 includes a deployable/inflatable double-layer hollow weave portion 3, having upper and lower fabrics, which inflate when fluid flows into the hollow weave portion 3 through a fluid-introduction port 5, a seam zone 2 provided on the outer periphery of the double-layer hollow weave portion 3, and a single-layer weave portion 6 provided further on the outer periphery of the seam zone 2. Upon the collision with an automobile or other object, the fluid is introduced into the deployable/inflatable double-layer hollow weave portion 3 from the fluid-introduction port 5 to deploy and inflate the double-layer hollow weave portion 3 to protect a passenger. A size of the fabric is 1.5 m to 3 m in the upper/lower direction in FIG. 3 (in the forward/backward direction of the vehicle) and 0.5 to 1.5 m in the leftward/rightward direction (the upper/lower direction of the vehicle).

Materials of warp yarns and weft yarns forming the inventive high-density hollow weave fabric are not limitative, and the following may be used: polyamide fiber obtained from nylon 66, nylon 6, nylon 46, nylon 610, nylon 612, or copolymers thereof or mixtures thereof; polyester fiber obtained from polyethylene terephthalate, polytrimethylne terephthalate, polybutylene terephathalate, poly ethylene naphthalate, or copolymers thereof or mixtures thereof; aromatic polyamide fiber such as paraphenylene terephthalamide and copolymers thereof with aromatic ether; aromatic polyester fiber; vinylon fiber; polyolefin fiber such as high-strength polyethylene or poly propylene; vinyl chloride and vinylidene fiber; fluorine type fiber including polytetra fluroethylene type; polysulfon fiber; polyphenylene sulfide fiber (PPS); polyether ketone type fiber (PEEK); polyalkyl ketone fiber; polyimide fiber; polyether imide fiber; cellulose fiber including high-strength rayon; acrylic fiber, carbon fiber; glass fiber; silicon carbide fiber; alumina fiber or others. Of them, synthetic fibers are preferable in view of strength and economy. Polyamide fiber, particularly polyhexamethylene adipamide filament is preferable because it has little impact against a passenger.

These fibers may be added with various additives for improving the processibility in a flat yarn (also referred to as producer's yarn) manufacturing process or a post treatment process. For example, one or more kinds of the following agents may be used: a thermoresistant stabilizer, a light-resistant stabilizer, an anti-aging agent, an anti-oxidant, a lubricant, a smoother, a pigment, a water repellent, an oil repellent, an opacifying agent such as titanium oxide, a gloss agent, a flame-retardant, a plasticizer, an antistatic agent and a thickening agent. If necessary, a twisting process, a bulking process, a texturizing process or other processes may be applied to the fiber yarn.

Warp yarns or weft yarns forming the high-density hollow weave fabric necessarily have a total yarn size in a range from 100 dtex to 500 dtex, preferably from 150 dtex to 400 dtex, more preferably lower than 250 dtex. If the total yarn size is in this range, the resultant fabric is durable against a force applied upon deployment/inflation and becomes soft to improve the containment ability as well as being rapidly deployable. If the total yarn size is less than 100 dtex, the mechanical strength is insufficient against a force upon deployment/inflation of the air bag, resulting in the bursting of the air bag. Contrarily, if the total yarn size exceeds 500 dtex, fluffs are liable to generate in the warp yarn during the weaving operation, resulting in the deterioration of the weavability and the containment ability as well as a slowing of the deploying speed.

The fiber fineness of the warp yarn and the weft yarn is preferably in a range from 0.5 dtex to 4.5 dtex. If the fiber fineness is less than 0.5 dtex, the number of fibers forming the fabric becomes excessively large, whereby there is a high probability of the generation of many fluffs in the warp yarn during the weaving operation. Contrarily, if the fiber fineness exceeds 4.5 dtex, the resultant fabric becomes excessively hard, whereby there is a high probability of a slowing of the deployment speed.

There is no limitation to the cross-sectional shape of the warp yarn or weft yarn. It may be either a circle or a non-circle such as a triangle, a hexagon or a flat shape. Of them, the circular cross-section is preferable because it exhibits the largest mechanical strength.

A weaving density and a total yarn size in the high-density hollow weave fabric are preferably selected so that a cover factor (CF) of the double-layer hollow weave portion is in a range from 1900 to 2400. Regarding the single-layer seam zone, CF is twice the above value because of the single layer; i.e., in a range from 3800 to 4800. In this connection, CF of the fabric is represented by the following equation, wherein the number of yarns in the weaving operation is represented by the number of yarns in the double-layer hollow weave portion:

$$CF = (\text{the number of warp yarns per 2.54 cm}) \times \sqrt{\text{total warp yarn size } (dtex)} + (\text{the number of weft yarns per 2.54 cm}) \times \sqrt{\text{total weft yarn size } (dtex)}$$

For example, if the number of warp yarns per 2.54 cm on one surface of the double-layer hollow weave portion is 71, the total warp yarn size is 235 dtex, the number of weft yarns per 2.54 cm is 71 and the total weft yarn size is 235 dtex, the cover factor is 2177.

According to the present invention, the deployable/inflatable double-layer hollow weave portion forming the high-density hollow weave fabric has upper and lower layers of a plain weave pattern. It is necessary that the seam zone is formed adjacent to the double-layer hollow weave portion by at least a 2/2 basket weave portion a narrow width hollow weave portion and a 3/3 basket weave portion.

The basket weave pattern used herein is a weave pattern wherein a basic unit consisting of a predetermined number of warp yarns and weft yarns crossing each other in the sinking/floating direction is repeated both in the longitudinal and lateral directions, and it is also called a basket weave pattern.

The basket weave pattern forming the seam zone is preferably a n/n basket weave pattern wherein the same number of warp yarns and weft yarns cross each other, because the design of the air bag configuration then becomes easy. One of most characteristic features of the present invention is that the 2/2 basket weave pattern is used in the seam zone closer to the double-layer hollow weave portion and the 3/3 basket weave pattern is used in the seam zone farther therefrom via the narrow width hollow weave portion. Thereby, it is possible to suppress the generation of wrinkles and to obtain the high retention ratio of the internal pressure upon the deployment/inflation, particularly after the wet heat-resistant treatment, which are not achievable by the prior art. At present, it is supposed that such surprising features are caused by the following mechanisms. That is, while the yarn shifting does not occur when the double-layer hollow weave portion inflates and deploys and highly pressurized air is temporarily held therein since the 2/2 basket weave portion closer to the double-layer hollow weave portion is tight in structure, part of the pressurized air gradually leaks to the outer periphery side through interstices between fibers forming the 2/2 basket weave portion and reaches the outer 3/3 basket weave portion through the narrow width hollow weave portion. As the 3/3 basket weave portion is rougher in structure than the 2/2 basket weave portion, not only does the generation of wrinkles hardly occur but also the coating agent is easily permeable into the 3/3 basket weave portion to firmly bond the yarns with each other. Thus, it is possible to prevent air from leaking through the interstices between fibers. Contrarily, if a rougher weave pattern such as a 4/4 basket weave or more is adopted instead of the 3/3 basket weave patter, although the permeation of the coating agent is enhanced, there is a problem in that the coating may be irregular and the number of floating yarns increases not to firmly fix the yarns constituting the fabric even though the coating agent permeates therein, resulting in air leakage. When the basket weave pattern of more than four yarns is adopted, many floating yarns are generated to cause the air leakage. For the above-mentioned reasons, the 3/3 basket weave pattern must be employed on the side farther from the double-yarn hollow weave portion.

According to the present invention, an anti-air leakage property (a retention ratio of the internal pressure) is effectively exhibited after the wet heat-resistant treatment. If the 3/3 basket weave portion exists, the anti-air leakage property is maintained good even after the anti-wet heat treatment as the permeation of the coating agent is enhanced. When one 2/2 basket weave portion is combined with one 3/3 basket weave portion, the weavability becomes better in comparison with a case wherein two 2/2 basket weave portions are adjacent together since the floating/sinking structure of warp yarns is mitigated by the 3/3 basket weave pattern to prevent the warp tension from partially increasing.

The narrow width hollow weave portion disposed between the 2/2 basket weave portion and the 3/3 weave portion preferably has CF in a range from 1900 and 2400 and the number of yarns is in a range from 2 to 40 as in the double-layer hollow weave portion. By providing this narrow width hollow weave portion, the generation of fluffs in the warp yarns is suppressed during the weaving operation, at a high yarn density, to improve the weavability and the generation of wrinkles in the resultant fabric is also mitigated to result in a flat hollow weave fabric.

The number of yarns in the 2/2 basket weave pattern is in a range from 4 to 20, preferably 16 or less. In view of the generation of wrinkles, the number of yarns is most preferably 8 and less.

In the 3/3 basket weave pattern, the number of yarns is preferably any one of multiples of 3 in a range from 3 to 24, more preferably from 6 to 15, and in view of the generation of wrinkles, most preferably 12 or less.

Figure 2:
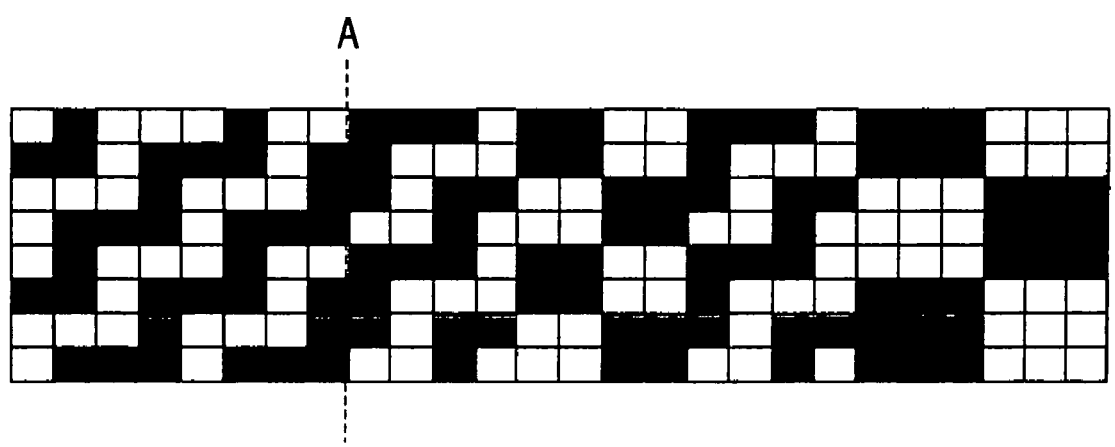
FIG. 2 illustrates a weave pattern for forming a double-layer hollow weave portion and a seamed portion of the hollow weave fabric shown in FIG. 1.

FIG. 1 is a schematic cross-sectional view of part of one embodiment according to the inventive fabric in the vicinity of a seam zone, and FIG. 2 illustrates weave patterns thereof. In FIG. 1, an area in the vicinity of the seam zone is constituted by a deployable/inflatable double-layer hollow weave portion (a large bag portion), a reversible figured weave portion, a 2/2 basket weave portion, a narrow width hollow weave portion, a 2/2 basket weave portion, a narrow width hollow weave portion and a 3/3 basket weave portion, wherein yarns 14 and 15 forming an upper fabric of the double-layer hollow weave portion and yarns 16 and 17 forming a lower fabric of the double-layer hollow weave portion are reversed, upside down to each other, on the respective sides of a broken line A. The four yarns 19 and 20 located directly after the interchange of the yarn positions in the reversible figured weave portion (yarns positioned on the right side of the broken line A) exist for the purpose of identifying the upper and lower fabrics. Although the number of these yarns may be optional, provided it is two or more, two to six is preferable in view of the improvement of the anti-air leakage property, and particularly four is preferable in view of the fabric design. As the yarns forming the upper fabric and the lower fabric are crossed to each other in the reversible figured weave pattern at a yarn reversing point (on the broken line A), the yarn density becomes larger to extremely disturb the air flow. Accordingly, the air permeability lowers to enhance the anti-air leakage property.

The reversible figured weave pattern is preferably provided adjacent to the deployable/inflatable double-layer hollow weave portion, because a load is uniformly distributed to a number of yarns constituting the reversible figured weave pattern and a force applied to one yarn becomes small to decrease factors causing the air leakage, such as yarn breakage or yarn shifting. Further, if two or more reversible figured weave portions are provided adjacent to each other, it is possible to prevent wrinkles from generating during the weaving operation to result in a flatter hollow weave fabric. The number of adjacent reversible figured weave portions is preferably six or less. Although there is substantially no problem even if the number exceeds six, a width of the seam zone becomes too large and the apparent configuration of the hollow weave fabric looks unfavorably bigger. The number of the reversible figured weave portions is more preferably four or less. When yarns in the deployable/inflatable double-layer hollow weave portion are stretched in the 180 degree direction, the yarns 14 and 15 in the upper fabric are pulled downward and the yarns 16 and 17 in the lower fabric are pulled upward due to the existence of the reversible figured weave pattern, whereby loads applied on the respective yarns on the broken line A become uniform. Also, as the yarns are densely intersected to each other in the boundary, the anti-air leakage property is improved. Contrarily, when the single-layer weave portion of the 3/3 basket weave pattern is provided on the double-layer hollow weave portion side, three floating yarns appear in the boundary. This increases the degree of freedom of the yarns to cause the yarn shifting, whereby there is a risk of air leakage. A width of the seam zone of the reversible figured weave pattern preferably corresponds to the number of weft yarns in a range from 1 to 8, more preferably 4 or less.

In the seam zone according to the present invention, the first weave portion is preferably formed of at least one reversible figured weave pattern and the 2/2 basket weave pattern because the generation of weave shifting is even less. The order of the weave patterns is preferably the double-layer hollow weave pattern, the reversible figured weave pattern and the 2/2 basket weave pattern. In this regard, the reversible figured weave is a weave pattern wherein yarns forming the upper and lower fabrics of the double-layer hollow weave portion are completely interchanged with each other. A double-layer hollow weave pattern may be further interposed between the reversible figured weave pattern and the basket weave pattern in the seam zone.

The non-inflatable/deployable portion of the present invention preferably is of a double-layer hollow weave pattern containing a partially knotted weave portion at least in a part thereof or throughout.

The partially knotted weave pattern is a hollow weave pattern based on a double-layer hollow weave pattern, having the single-layer weave patterns at places in the upper and lower fabrics of the hollow weave portion to prevent the upper and lower fabrics from shifting with respect to each other or to ease the handling thereof. The single-layer weave pattern may be formed by any of point or line patterns such as a hexagonal pattern or a bias line pattern.

When the high-density hollow weave fabric is woven by using a hollow weave loom, if the seam zone extends in the warp direction, a portion of the warp yarn succeeding thereto is subjected to a larger tension in comparison with others. This is because the consumption of the warp yarn is different between the single-layer weave portion and the hollow portion or the partially knotted portion. Accordingly, when the seam zone extends in the warp direction, the single-layer weave portions may be formed at positions not provided as the air bag or as the non-inflatable (but deployable) hollow weave portion so that the warp tension is mitigated.

When air is introduced into the inventive high-density hollow weave fabric to deploy the double-layer hollow weave portion, air enters the bag portion to make the flat bag fabric to be three-dimensional, whereby the upper fabric is lifted upward to reduce the size the bag fabric as a whole as seen in the plan view. Upon the maximum inflation, at the boundary between the double-layer hollow weave portion, the respective single-layer portions are separately stretched in diametrically opposite directions (in the 180-degree apart), whereby the respective single-layer weave portion are instantaneously stretched open at the boundary in the bag. At this time, a curved portion is particularly compressed or stretched. As the reversible figured weave pattern, the 2/2 basket weave pattern and the 3/3 basket weave pattern are continuously formed, air-tightness is maintained in the reversible figured weave portion even if the end of the double-layer hollow weave pattern is made wider by the deployment. Provision of the 2/2 basket weave pattern adjacent to the reversible figured weave pattern is effective for facilitating the air-tightness and reducing wrinkles in the hollow weave fabric. Also, due to the softness of the fabric, the compression and elongation upon the inflation are absorbable. Further, the 3/3 basket weave pattern provides complete air-tightness.

Warp yarns used in the high-density hollow weave fabric may be either non-sized yarns or sized yarns. The non-sized yarn is preferably an interlaced yarn having interlaced points in a range from 10/m to 40/m, more preferably from 20 to 35. The warp yarn may be twisted to have the number of twists of 300 T/m or less, preferably in a range from 50 T/m to 100 T/m. Also, the warp yarns may be imparted with oil or wax during the warping process to have smoothness or cohesion. The warp yarns may be sized with a sizing agent based on acrylic, the combination of acrylic and PVA, acrylate or silicone. In such a case, the application amount is preferably in a range from 0.5 to 3% owf.

Weft yarns are the same as warp yarns although the number of interlaced points may be less than that of the warp yarn; i.e., preferably in a range from 5/m to 50/m. When an air-jet loom is used, if the number of interlaced points exceeds 50/m, the weft yarn does not run smoothly together with air-jet, whereby the high speed weaving is difficult. Contrarily, if the number of interlaced points is less than 5/m, the weft yarn is liable to open into individual fibers due to compressed air ejected from a nozzle, which disturbs the picking to result in knots in the weft yarn. When a rapier loom is used, however, the number of interlaced points is not so important.

To manufacture the inventive high-density hollow weave fabric, any kind of loom such as an air-jet loom, a rapier loom, a projectile loom or a multi-phase loom may be used. As the high-density hollow weave fabric has a high yarn density, a full-size temple is preferably used for stabilizing the cloth fell. The full-size temple may have ribs or grooves to brake the movement of the fabric and stabilize the cloth fell. Also, additional yarns may be used in both selvages of the fabric to correct the slack. The raising and lowering motion of warp yarns is controlled by using a jacquard machine or a dobby machine. An electronic jacquard machine is advantageous in view of productivity or a change of design. While there is no limitation in the number of needles in the jacquard machine, the electronic jacquard machine having many needles, for example, 2,000 to 14,000, is favorable because it can accurately cope with complicated designs.

When air bags are produced from the inventive high-density hollow weave fabric, both surfaces of the fabric are preferably coated with a coating agent such as silicone resin or polyurethane resin for the purpose of reducing the air permeability, preventing the yarn shifting or avoiding bursting. While the containment ability of the air bag becomes better as the coating thickness is less, the thickness is necessarily 10 g/m$^2$ or more, preferably 140 g/m$^2$ or less, more preferably 100 g/m$^2$ or less, most preferably 50 g/m$^2$ or less in view of the anti-air leakage property.

By using the high-density hollow weave fabric free from weaving wrinkle, it is possible to reduce the coating irregularity caused by wrinkles generated between the double-layer hollow weave portion and the seam zone, whereby the fabric having the excellent anti-air leakage property is obtainable after the coating.

As a pretreatment of the coating, the dimensions of the fabric in the warp and weft directions may be controlled to be within a desired range by a usual scouring-heat setting process or together with a calendering process.

The air-permeability of the inventive high-density hollow weave fabric preferably has the air-permeability of 0.5 cm$^3$·s or less. If it exceeds 0.5 cm$^3$·s, there is a risk in that the silicone coating is not uniform and the internal pressure retaining ability necessary for the curtain-shaped air bag is unsatisfactory. In this regard, the air-permeability is defined by JIS L1096 8.27.1; Method A (Frajour type test).

Silicone rubber is preferably used for the silicone coating in the present invention.

Silicone rubber preferably has the following composition:

(a) organo-polysiloxane having the viscosity at 25° C. in a range from 100 to 200000 mPa·s and a vinyl group at an end site bonded to SiC in a range from 5 to 70 parts by weight, (b) organo-hydrogen polysiloxane having SiH group in a range of from 0.1 to 30 parts by weight, (c) a catalyst capable of facilitating the addition of SiH group to aliphatic unsaturated group in a range from 0.01 to 10 parts by weight, and (d) an organic solvent in a range from 0 to 80 parts by weight.

(wherein (a)+(b)+(c)=100 parts by weight.)

Of them, (a) is a chief ingredient wherein the vinyl group at the end site forms the silicone rubber by the addition reaction.

Composition (b) contains a cross-linking agent of organohydrogen polysiloxane having SiH group. The organo-hydrogen polysiloxane has a ratio of $Si(OR)_4$ to $SiH(OR)_3$ in a polysiloxane skeleton preferably in a range from 10:1 to 1:1, more preferably from 5:1 to 1:1. The organ-polysiloxane exists in the composition of the present invention in a range from 10:1 to 1:1 of a ratio of Si-bonded hydrogen to Si-bonded aliphatic unsaturated group.

Composition (c) contains a catalyst which, for example, is platinum or platinum halide distributed as fine powder on a carrier such as silicon dioxide, aluminum oxide or active carbon.

This composition may be used after being added with organic solvent to form a dope, or may be used without added with organic solvent.

The silicone composition may contain known silane coupling agent, flame-retardant agent, filler such as silica, pigment or stabilizer.

The amount of silicone coating is preferably in a range from $10 \, g/m^2$ to $140 \, g/m^2$, More preferably, it is $100 \, g/m^2$ or less, and most preferably $50 \, g/m^2$ or less.

If this value is $140 \, g/m^2$ or less, it is possible to obtain a high-density hollow weave fabric excellent in air-tightness, and if this value is $100 \, g/m^2$ or less, preferably $50 \, g/m^2$ or less, it is possible to obtain a high-density hollow weave fabric light in weight and excellent in air-tightness which is suitable for a side curtain.

The most preferable high-density hollow weave fabric is obtained by using polyhexamethylene adipamide filament yarns coated with silicone of $140 \, g/m^2$, which fabric has the retention ratio of the internal pressure of 70% or more 8 seconds after the inflation/deployment.

The silicone coating is usually carried out by a floating knife coater, a roll-on knife coater, a comma coater, a reverse roll coater, a gravure coater or others known in the prior art. Of course, while a silicone resin film may be laminated with the fabric, the adhesiveness slightly deteriorates.

EXAMPLES

The present invention will be more concretely described below based on examples. In this regard, the measuring methods and the estimating methods are as follows:

(1) Weavability (the Number of Loom Stoppages)

The weavability was tested at a weaving speed of 700 rpm by using an air-jet loom LWV (having a width of 240 cm) manufactured by DORNIER with an electronic jacquard machine LX1600 (3072 needles) manufactured by STABLI in which three harnesses are suspended. In some cases wherein the air-jet loom could not be used due to the yarn size, the weavability was tested at the weaving speed of 480 rpm by using a rapier loom G6200 (having a width of 140 cm) manufactured by Sulzer with an electronic jacquard machine CX960 (4096 needles) manufactured by STAUBLI in which one harness is suspended. The loom stoppage caused by warp yarns, such as yarn breakage, fluffs, failure of weft picking due to mis-shedding or others, and that caused by weft yarns such as mis-picking due to the entanglement or bending of a front end of the weft yarn during the picking were counted. If the loom stoppage caused by warp yarn is in a range from 3 to 10 times/100 m per loom or that caused by weft yarns is in a range from 10 to 30 times/100 m per loom, the weavability was estimated as allowable. On the other hand, if the loom stoppage caused by warp yarn is 11 times/100 m per loom or more, or that caused by weft yarns is 31 times/100 m per loom or more, the weavability was estimated as problematic.

(2) Wrinkles and Coating Irregularity

The wrinkles and the coating irregularity on the finished fabric were observed on a fabric inspection machine operated at a speed of 10 m/min by five experts having the experience of five years or longer in fabric production. The generation of wrinkles was classified into four classes based on the following criteria:

Class 5: An area of the fabric between the single-layer portion and the bag portion is flat and no wrinkle is visible.
Class 4: Few wrinkles are visible.
Class 3: Wrinkles are vaguely visible.
Class 2: Wrinkles and the coating irregularity are visible.
Class 1: Wrinkles and the roughness of the coating are clearly visible.

The results of the five experts were averaged, and the estimation of the wrinkles was done as follows:
Class 4 or higher: allowable
Class 3 to lower than class 4: allowable but somewhat problematic
Less than Class 3: problematic The coating irregularity was classified into four classes based on the following criteria:
Class 5: No coating irregularity on the fabric.
Class 4: The coating irregularity is very slightly visible.
Class 3: The coating irregularity is visible.
Class 2: The coating irregularity is clearly visible.
Class 1: The coating irregularity is extremely clearly visible.

The results of the five experts were averaged, and the estimation of the coating irregularity was done as follows:
Class 4 or higher: allowable
Class 3 to lower than class 4: allowable but somewhat problematic
Less than Class 3: problematic In this regard, the finished fabric is a fabric obtained by scouring the gray fabric in the conventional manner and then being coated with resin.

(3) Retention Ratio of the Internal Pressure in an Air Bag

An internal pressure of a hollow weave air bag was tested as follows. The coated air bag was connected to an end of a 300 L air tank having an internal pressure of 100 kPa via a metallic tube. A valve attached to the end of the tank instantaneously opened by using a magnetic valve. After eight seconds, the internal pressure of the hollow weave air bag was inspected by a pressure sensor attached to a tube of the hollow weave air bag. If the retention ratio of the internal pressure is 50% of the initial pressure, it is estimated that the air bag is allowable. If the ratio is in a range from 30% to less than 50%, the estimation is that the air bag is allowable but somewhat problematic. If the ratio is less than 30%, the estimation is that the air bag is problematic. The number of the measurements was ten, and if at least one of the values did not exceed 30%, such an air bag was estimated as problematic.

(4) Fineness

The measurement was carried out in accordance with JIS L 1073.

(5) Roughness of the Surface of Finished Fabric

A thickness of the double-layer hollow weave portion and that of the single-layer weave portion of the coated fabric were measured by a surface roughness tester. A needle of the tester moved from the double-layer weave portion to the seam zone so that the single-layer weave portion is disposed vertical the moving direction of the needle. That is, the needle moved 5 mm in the double-layer hollow weave portion and then shifted to the seam zone. The average thickness of the double-layer hollow weave portion and that of the single-layer weave portion were measured. Then the difference ($\delta$) between the both is divided by the thickness (d) of the double-layer hollow weave portion to obtain a value ($\delta$/d). The above operation was repeated fifty times at different positions. If the average value of $\delta$/d is less than 0.05, the estimation is that the roughness is allowable. If this value is in a range from 0.05 to less than 0.1, the estimation is that the roughness is allowable but somewhat problematic. If the value is 0.1 or more, the estimation is that the roughness is problematic. In this regard, when there are two or more single-layer weave portions in the seam zone, the thickness was measured in both the portions and a larger value was adopted.

(6) Softness

Hardness of the air bag inflated by introducing air therein from a 300 L air tank having an internal pressure of 100 kPa was inspected by five experts. The estimations of the five experts are averaged and classified into Class 5 (soft), Class 4 (slightly soft), Class 3 (intermediate), Class 2 (slightly hard) and Class 1 (hard). Class 3 or more was estimated as allowable, Class 2 to less than Class 3 was estimated as allowable but somewhat problematic, and less than Class 2 was estimated as unallowable.

(7) Anti-Wet Heat Adhesiveness

The wet heat treatment was carried out in accordance with ISO 5981, Method A wherein the wet heat condition is 80° C.×95% RH×200 hours. The retention ratio of the internal pressure in the air bag described in the above-mentioned item (3) was measured on the treated fabric.

Example 1

A gray fabric was woven from non-twisted polyhexamethylene adipamide filament yarns having the yarn size of 235 dtex and the fiber fineness of 3.3 dtex, the interlaced points of 32/m, the interlacement strength of 27% and the oil adhesion amount of 1.0% by weight used as warp yarns and weft yarns by using the above-mentioned rapier loom and electronic jacquard machine under the condition wherein a warp density on loom is 126.6 end/2.54 cm, a weft density on loom is 136 end/2.54 cm, a space ratio of the reed is 66.8% and a warp tension during the weaving operation is 0.25 cN/dtex. The seam zone was composed of the 2/2 basket weave pattern formed of six yarns, the narrow width hollow weave portion formed of four yarns and the 3/3 basket weave pattern formed of six yarns as seen from the double-layer hollow weave portion side. Then, this gray fabric was subjected to a scouring and setting process, and thereafter subjected to a coating process wherein an amount of 50 g/m$^2$ of silicone resin described below is coated on both surfaces of the fabric by using a roll-on knife to result in a finished high-density hollow weave fabric having a warp density of 146 end/2.54 cm, a weft density of 146 end/2.54 cm. The cover factor was 2238 on one surface.

Preparation of Silicone Resin:

(1) 11 parts by weight of silica treated with hexamethyldisilazane and 33% by weight of vinyl-terminated polydimethylsiloxane, having the viscosity of 150,000 mPa·s at 25° C. were mixed in a kneader, and then added with 0.03 parts by weight of vinyl-terminated cyclohexanol and 0.07% by weight of platinum catalyst while being kneaded.

(2) 11 parts by weight of silica treated with hexamethyldisilazane and 33% by weight of vinyl-terminated polydimethylsiloxane, having the viscosity of 150,000 mPa·s at 25° C. were mixed in a kneader, and then added with 8 parts by weight of organo-hydrogen siloxane having the viscosity of approximately 1,000 mPa·s at 25° C. while being kneaded.

(3) 44% by weight of the mixture obtained in (1), 52% by weight of the mixture obtained in (2), 1.5% by weight of organo-hydrogen siloxane having the viscosity of approximately 20 mPa·s at 25° C., 0.9% by weight of tetraethoxysilane and 0.9% by weight of platinum catalyst were mixed in a kneader to obtain a liquidized silicone compound.

50 g/m$^2$ of the liquidized silicone compound was coated on one surface of the above-mentioned high-density hollow weave fabric by a roll-on knife coater and heat-treated in a drier at 180° C. for one minute. Similarly, 50 g/m$^2$ of the liquidized silicone compound was coated on the other surface thereof and heat-treated in a drier at 180° C. for one minute. Thus, the final high-density hollow weave fabric was obtained.

Properties of the resultant fabric were shown on Table 1. That is, there was no loom stoppage during the weaving operation which shows that the weavability is favorable. The finished fabric was free from wrinkles and coating irregularity. The roughness of the seam zone was low and allowable level, and the retention ratio of the internal pressure was also very good. The fabric was soft and the adhesiveness against anti-wet heat treatment was excellent. Also, the fabric was deployable at a high speed.

Example 2

Under the same condition as in Example 1, a finished fabric having the warp density of 137 end/2.54 cm and the weft density of 146 end/2.54 cm was obtained, except that the warp density on loom was changed to 120.0 end/2.54 cm. The cover factor in the narrow width hollow weave portion was 2169 on one surface.

Properties of the resultant fabric were shown on Table 1. That is, there was no loom stoppage during the weaving operation which shows that the weavability is favorable. The finished fabric was free from wrinkles and coating irregularity. The roughness of the seam zone was low and allowable, and the retention ratio of the internal pressure was also good. The fabric was soft and the adhesiveness against anti-wet heat treatment was excellent. Also, the fabric was deployable at a high speed because the yarn size is as small as 235 dtex.

Example 3

Under the same condition as in Example 1, a finished fabric having the warp density of 160 end/2.54 cm and the weft density of 142 end/2.54 cm was obtained, except that the warp density on loom was changed to 147.4 end/2.54 cm. The cover factor in the narrow width hollow weave portion was 2315 on one surface.

Properties of the resultant fabric were shown on Table 1. That is, the loom stoppage was extremely few which shows that the weavability is favorable. The finished fabric was free from generation of wrinkles and coating irregularity. The flatness of the boundary was favorable, and the retention ratio of the internal pressure was very good which means that the impact on the human body is small. The adhesiveness against anti-wet heat treatment was excellent. Also, the fabric was deployable at a high speed because the yarn size is as small as 235 dtex.

Example 4

Under the same condition as in Example 1, a finished fabric having the warp density of 127 end/2.54 cm and the weft density of 146 end/2.54 cm was obtained, except that the warp density on loom was changed to 112.2 end/2.54 cm. The cover factor in the narrow width hollow weave portion was 2093 on one surface.

Properties of the resultant fabric were shown on Table 1. That is, the loom stoppage was extremely rare which shows that the weavability is favorable. The finished fabric was free from wrinkles and coating irregularity. The flatness of the boundary of coated fabric was favorable. While the retention ratio of the internal pressure was insufficient, it was still above the allowable level. The fabric was soft and the adhesiveness against anti-wet heat treatment was excellent. Also, the fabric was deployable at a high speed because the yarn size is as small as 235 dtex.

Example 5

Under the same condition as in Example 1, a finished fabric having the warp density of 128 end/2.54 cm and the weft density of 129 end/2.54 cm was obtained, except that the warp density on loom was changed to 112.2 end/2.54 cm and the weft density on loom was changed to 120 end/2.54 cm. The cover factor in the narrow width hollow weave portion was 1970 on one surface.

Properties of the resultant fabric were shown on Table 1. That is, there was no loom stoppage during the weaving operation that shows that the weavability is favorable. The finished fabric was free from wrinkles and coating irregularity. The flatness of the boundary was good. While the retention ratio of the internal pressure was insufficient, it was well above the allowable level. The fabric had softness and the adhesiveness against anti-wet heat treatment was excellent. Also, the fabric was deployable at a high speed because the yarn size is as small as 235 dtex.

Comparative Example 1

Under the same condition as in Example 1, a finished fabric having the warp density of 122 end/2.54 cm and the weft density of 124 end/2.54 cm was obtained, except that the warp density on loom was changed to 108.9 end/2.54 cm and the weft density on loom was changed to 116 end/2.54 cm. The cover factor in the narrow width hollow weave portion was 1886 on one surface.

Properties of the resultant fabric were shown on Table 1. That is, the loom stoppage during the weaving operation was rare which shows that the weavability is favorable. The finished fabric was free from wrinkles and coating irregularity. The flatness of the boundary was favorable. However, the retention ratio of the internal pressure did not reach the allowable level. The fabric was soft but the adhesiveness against anti-wet heat treatment did not reach the allowable level. Also, the fabric was deployable at a high speed because the yarn size is as small as 235 dtex.

Comparative Example 2

Under the same condition as in Example 1, a finished fabric having the warp density of 176 end/2.54 cm and the weft density of 141 end/2.54 cm was obtained, except that the warp density on loom was changed to 157.5 end/2.54 cm. Since many fluffs generated in the warp yarns, the weaving operation was considerably difficult. The cover factor in the narrow width hollow weave portion was 2430 on one surface.

Properties of the resultant fabric were shown on Table 1. That is, the loom stoppage caused by the warp yarns was very common, and the gray fabric had many fluffs in the warp yarns. The finished fabric had many wrinkles and coating irregularities. The flatness of the boundary was slightly unfavorable. The retention ratio of the internal pressure did not reach the allowable level. The adhesiveness against anti-wet heat treatment did not reach the allowable level. The fabric was deployable at a high speed because the yarn size is as small as 235 dtex.

Example 6

Under the same condition as in Example 1, a finished fabric having the warp density of 142 end/2.54 cm and the weft density of 146 end/2.54 cm was obtained, except that the seam zone was composed of the 2/2 basket weave pattern formed of four yarns, the narrow width hollow weave portion formed of six yarns and the 3/3 basket weave pattern formed of six yarns via the reversible figured weave pattern and the hollow weave pattern formed of four yarns as seen from the double-layer hollow weave portion side (see FIG. 1). The cover factor in the narrow width hollow weave portion was 2238 on one surface.

Properties of the resultant fabric were shown on Table 1. That is, there was no loom stoppage during the weaving operation which shows that the weavability is favorable. The finished fabric was free from wrinkles and coating irregularity. The flatness of the boundary was favorable, and the retention ratio of the internal pressure was also very good. The fabric was soft and the adhesiveness against anti-wet heat treatment was excellent. Also, the fabric was deployable at a high speed because the yarn size is as small as 235 dtex.

Example 7

Under the same condition as in Example 1, a finished fabric having the warp density of 146 end/2.54 cm and the weft density of 146 end/2.54 cm was obtained, except that the seam zone was composed of the 2/2 basket weave pattern formed of four yarns, the narrow width hollow weave portion formed of four yarns and the 3/3 basket weave pattern formed of six yarns via the reversible figured weave pattern and the hollow weave pattern formed of four yarns, and again via the reversible figured weave pattern and the hollow weave pattern formed of four yarns, as seen from the double-layer hollow weave portion side. The cover factor in the narrow width hollow weave portion was 2238 on one surface.

Properties of the resultant fabric were shown on Table 1. That is, there was no loom stoppage during the weaving operation which shows that the weavability is favorable. The finished fabric was free from wrinkles and coating irregularity. The flatness of the boundary was favorable, and the retention ratio of the internal pressure was also very good. The fabric was soft and the adhesiveness against anti-wet heat treatment was excellent. Also, the fabric was deployable at a high speed because the yarn size is as small as 235 dtex.

Example 8

Under the same condition as in Example 1, a finished fabric having the warp density of 146 end/2.54 cm and the weft density of 146 end/2.54 cm was obtained, except that the seam zone was composed of the 2/2 basket weave pattern formed of four yarns, the narrow width hollow weave portion formed of four yarns and the 3/3 basket weave pattern formed of six yarns as seen from the double-layer hollow weave portion side. The cover factor in the narrow width hollow weave portion was 2238 on one surface.

Properties of the resultant fabric were shown on Table 1. That is, there was no loom stoppage during the weaving operation which shows that the weavability is favorable. The finished fabric had less wrinkles and less coating irregularity. The flatness of the boundary was good, and the retention ratio of the internal pressure was also very good. The fabric was soft and the adhesiveness against anti-wet heat treatment was excellent. Also, the fabric was deployable at a high speed because the yarn size is as small as 235 dtex.

Example 9

Under the same condition as in Example 1, a finished fabric having the warp density of 147 end/2.54 cm and the weft density of 146 end/2.54 cm was obtained, except that the seam zone was composed of the 2/2 basket weave pattern formed of sixteen yarns, the narrow width hollow weave portion formed of four yarns and the 3/3 basket weave pattern formed of six yarns as seen from the double-layer hollow weave portion side. The cover factor in the narrow width hollow weave portion was 2246 on one surface.

Properties of the resultant fabric were shown on Table 1. That is, there was no loom stoppage during the weaving operation which shows that the weavability is favorable. The finished fabric reached the allowable level in the occurrence of wrinkles and coating irregularity. The flatness of the boundary was good, and the retention ratio of the internal pressure was also very good. The fabric was soft and the adhesiveness against anti-wet heat treatment was excellent. Also, the fabric was deployable at a high speed because the yarn size is as small as 235 dtex.

Example 10

Under the same condition as in Example 1, a finished fabric having the warp density of 146 end/2.54 cm and the weft density of 146 end/2.54 cm was obtained, except that the seam zone was composed of the 2/2 basket weave pattern formed of two yarns, the narrow width hollow weave portion formed of four yarns and the 3/3 basket weave pattern formed of six yarns as seen from the double-layer hollow weave portion side. The cover factor in the narrow width hollow weave portion was 2238 on one surface.

Properties of the resultant fabric were shown on Table 1. That is, there was no loom stoppage during the weaving operation which shows that the weavability is favorable. The finished fabric was less in the occurrence of wrinkles and coating irregularity. The flatness of the boundary was favorable, and the retention ratio of the internal pressure was also very good. The fabric was soft and the adhesiveness against anti-wet heat treatment was excellent. Also, the fabric was deployable at a high speed because the yarn size is as small as 235 dtex.

Example 11

Under the same condition as in Example 1, a finished fabric having the warp density of 147 end/2.54 cm and the weft density of 146 end/2.54 cm was obtained, except that the seam zone was composed of the 2/2 basket weave pattern formed of twenty yarns, the narrow width hollow weave portion formed of four yarns and the 3/3 basket weave pattern formed of six yarns as seen from the double-layer hollow weave portion side. The cover factor in the narrow width hollow weave portion was 2246 on one surface.

Properties of the resultant fabric were shown on Table 1. That is, the loom stoppage is rare during the weaving operation which shows that the weavability is favorable. The finished fabric reached the allowable level in the occurrence of wrinkles and coating irregularity. The flatness of the boundary was generally favorable although somewhat insufficient, and the retention ratio of the internal pressure was good. The softness of the fabric was satifiable level and the adhesiveness against anti-wet heat treatment was excellent. Also, the fabric was deployable at a high speed because the yarn size is as small as 235 dtex.

Example 12

Under the same condition as in Example 1, a finished fabric having the warp density of 146 end/2.54 cm and the weft density of 146 end/2.54 cm was obtained, except that the seam zone was composed of the 2/2 basket weave pattern formed of six yarns, the narrow width hollow weave portion formed of four yarns and the 3/3 basket weave pattern formed of three yarns as seen from the double-layer hollow weave portion side. The cover factor in the narrow width hollow weave portion was 2238 on one surface.

Properties of the resultant fabric are shown on Table 1. That is, there were few loom stoppages during the weaving operation which shows that the weavability is favorable. The finished fabric was low in the generation of wrinkles and coating irregularity. The flatness of the boundary was very favorable, and the retention ratio of the internal pressure was good. The fabric was soft and the adhesiveness against anti-wet heat treatment was excellent. Also, the fabric was deployable at a high speed because the yarn size is as small as 235 dtex.

Example 13

Under the same condition as in Example 1, a finished fabric having the warp density of 146 end/2.54 cm and the weft density of 146 end/2.54 cm was obtained, except that the seam zone was composed of the 2/2 basket weave pattern formed of six yarns, the narrow width hollow weave portion formed of four yarns and the 3/3 basket weave pattern formed of fifteen yarns as seen from the double-layer hollow weave portion side. The cover factor in the narrow width hollow weave portion was 2238 on one surface.

Properties of the resultant fabric are shown in Table 1. That is, there were few loom stoppages during the weaving operation which shows that the weavability is favorable. Although there were some wrinkles in the finished fabric, but the fabric had an allowable level wrinkles. The fabric had less and tolerable coating irregularity. The roughness of the boundary was favorable, and the retention ratio of the internal pressure was good. The fabric was soft and the adhesiveness against anti-wet heat treatment was excellent. Also, the fabric was deployable at a high speed because the yarn size is as small as 235 dtex.

Comparative Example 3

Under the same condition as in Example 1, a finished fabric having the warp density of 146 end/2.54 cm and the weft density of 146 end/2.54 cm was obtained, except that the seam zone was composed of the 2/2 basket weave pattern formed of six yarns (without the bag body and the 3/3 basket weave pattern) as seen from the double-layer hollow weave portion side. The cover factor in the narrow width hollow weave portion was 2238 on one surface.

Properties of the resultant fabric are shown on Table 1. That is, there were few loom stoppages during the weaving operation which shows that the weavability is favorable. Also, the flatness of the boundary was good. However, the retention ratio of the internal pressure did not reach the allowable level. Also, the adhesiveness against anti-wet heat treatment did not reach the allowable level.

Example 14

Under the same condition as in Example 1, a finished fabric having the warp density of 146 end/2.54 cm and the weft density of 146 end/2.54 cm was obtained, except that the seam zone was composed of the 2/2 basket weave pattern formed of six yarns, the narrow width hollow weave portion formed of four yarns and the 3/3 basket weave pattern formed of twenty one yarns as seen from the double-layer hollow weave portion side. The cover factor in the narrow width hollow weave portion was 2238 on one surface.

Properties of the resultant fabric are shown on Table 1. That is, there was few loom stoppage during the weaving operation which shows that the weavability is favorable. Although there were some wrinkles in the finished fabric, the presence of wrinkles was of allowable level. The coating irregularity was tolerable. The flatness of the boundary was favorable, and the retention ratio of the internal pressure was good. The fabric was soft and the adhesiveness against anti-wet heat treatment was excellent. Also, the fabric was deployable at a high speed because the yarn size is as small as 235 dtex.

Example 15

Under the same condition as in Example 1, a finished fabric having the warp density of 146 end/2.54 cm and the weft density of 146 end/2.54 cm was obtained, except that the seam zone was composed of the 2/2 basket weave pattern formed of six yarns, the narrow width hollow weave portion formed of forty yarns and the 3/3 basket weave pattern formed of six yarns as seen from the double-layer hollow weave portion side. The cover factor in the narrow width hollow weave portion was 2238 on one surface.

Properties of the resultant fabric were shown on Table 1. That is, there were few loom stoppages during the weaving operation which shows that the weavability is favorable. The finished fabric was less in the generation of wrinkles and coating irregularity. The flatness of the boundary was favorable, and the retention ratio of the internal pressure was good. The fabric had a saisfiable softness and the adhesiveness against anti-wet heat treatment was excellent. Also, the fabric was deployable at a high speed because the yarn size is as small as 235 dtex.

Example 16

Under the same condition as in Example 1, a finished fabric having the warp density of 145 end/2.54 cm and the weft density of 146 end/2.54 cm was obtained, except that the seam zone was composed of the 2/2 basket weave pattern formed of six yarns, the narrow width hollow weave portion formed of fifty two yarns and the 3/3 basket weave pattern formed of six yarns as seen from the double-layer hollow weave portion side. The cover factor in the narrow width hollow weave portion was 2231 on one surface.

Properties of the resultant fabric were shown on Table 1. That is, there were few loom stoppages during the weaving operation which shows that the weavability is favorable. The finished fabric was less in the generation of wrinkles and coating irregularity. The roughness of the boundary was favorable. Although the flatness ratio of the internal pressure was slightly unsatisfactory, it still reached the allowable level. The fabric was soft and the adhesiveness against anti-wet heat treatment was excellent. Also, the fabric was deployable at a high speed because the yarn size is as small as 235 dtex.

Example 17

Under the same condition as in Example 1, a finished fabric having the warp density of 147 end/2.54 cm and the weft density of 146 end/2.54 cm was obtained, except that the seam zone was composed of the 2/2 basket weave pattern formed of six yarns, the narrow width hollow weave portion formed of two yarns and the 3/3 basket weave pattern formed of six yarns as seen from the double-layer hollow weave portion side. The cover factor in the narrow width hollow weave portion was 2246 on one surface.

Properties of the resultant fabric are shown on Table 1. That is, there were few loom stoppages during the weaving operation which shows that the weavability is favorable. The finished fabric was less in the generation of wrinkles and coating irregularity. The flatness of the boundary was good, and the retention ratio of the internal pressure was good. The fabric was softness and the adhesiveness against anti-wet heat treatment was excellent. Also, the fabric was deployable at a high speed because the yarn size is as small as 235 dtex.

Comparative Example 4

Under the same condition as in Example 1, a finished fabric having the warp density of 147 end/2.54 cm and the weft density of 146 end/2.54 cm was obtained, except that the seam zone was composed of the 3/3 basket weave pattern formed of six yarns as seen from the double-layer hollow weave portion side. The cover factor in the narrow width hollow weave portion was 2246 on one surface.

Properties of the resultant fabric were shown on Table 1. That is, there was few loom stoppage during the weaving operation which shows that the weavability is favorable. The finished fabric was less in the generation of wrinkles and coating irregularity. While the flatness of the boundary was favorable, the retention ratio of the internal pressure was bad. Also, while the fabric was soft, the adhesiveness against anti-wet heat treatment did not reach the allowable level. The fabric was deployable at a high speed because the yarn size is as small as 235 dtex.

Comparative Example 5

Figure 7:
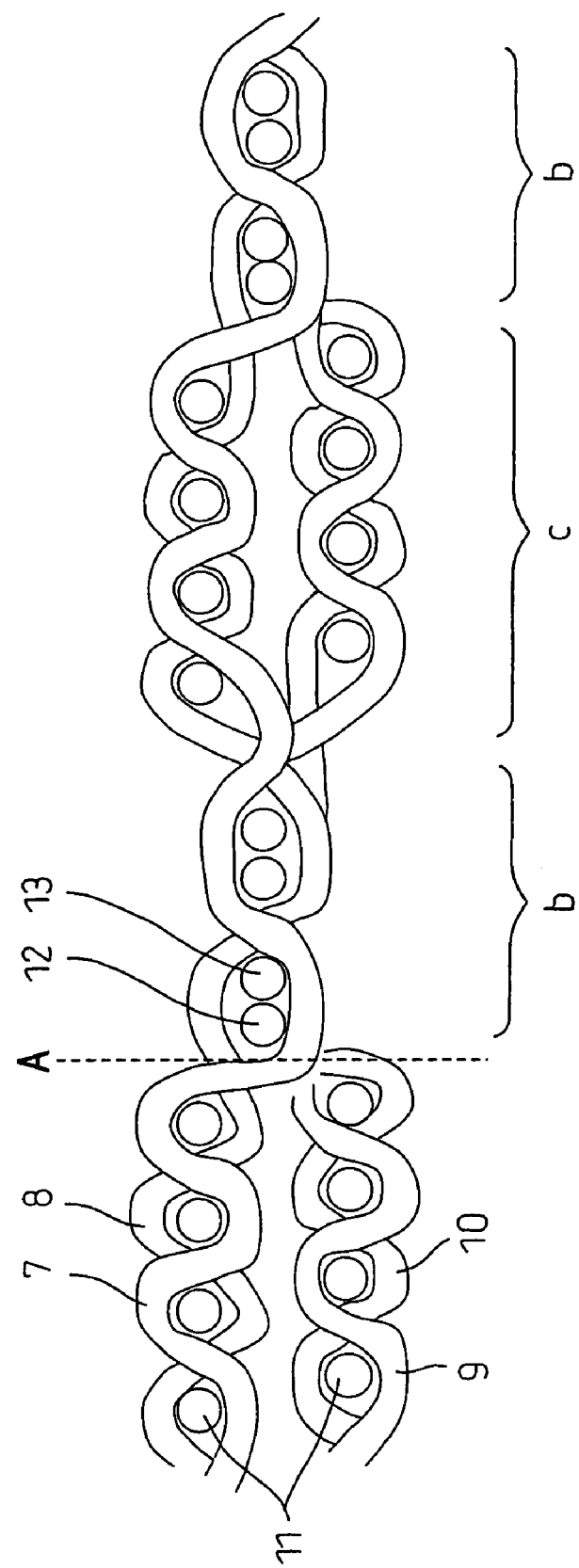
FIG. 7 is a schematic cross-sectional view of part a prior art high-density hollow weave fabric in the vicinity of a seam zone.
Figure 8:
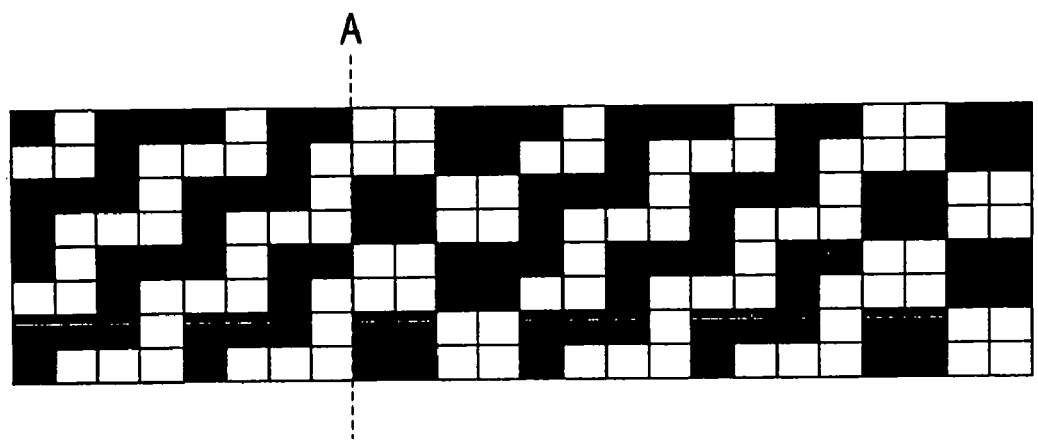
FIG. 8 illustrates a weave pattern of part of the high-density hollow weave fabric shown in FIG. 7, forming the a double-layer hollow weave portion and the seam zone.

Under the same condition as in Example 1, a finished fabric having the warp density of 147 end/2.54 cm and the weft density of 146 end/2.54 cm was obtained, except that the seam zone was composed of the 2/2 basket weave pattern formed of four yarns, the narrow width hollow weave portion formed of eight yarns and the 2/2 basket weave pattern formed of four yarns as seen from the double-layer hollow weave portion side (see FIG. 7). The cover factor in the narrow width hollow weave portion was 2246 on one surface.

Properties of the resultant fabric are shown on Table 1. That is, there were few loom stoppages during the weaving operation which shows that the weavability is favorable. While the finished fabric had some wrinkles and coating irregularity, the presence of wrinkles was of allowable level. While the flatness of the boundary was not fully satisfactory, it still reached the allowable level. The retention ratio of the internal pressure was bad. Also, while the fabric was soft, the adhesiveness against anti-wet heat treatment did not reach the allowable level. The fabric was deployable at a high speed because the yarn size is as small as 235 dtex.

Example 18

Under the same condition as in Example 1, a finished fabric having the warp density of 146 end/2.54 cm and the weft density of 146 end/2.54 cm was obtained, except that an amount of coated silicone resin was changed to 15 g/m² per one surface. The cover factor in the narrow width hollow weave portion was 2238 on one surface.

Properties of the resultant fabric are shown on Table 1. That is, there was no loom stoppage during the weaving operation which shows that the weavability is favorable. The finished fabric was less in the generation of wrinkles and coating irregularity. The flatness of the boundary was favorable. While the retention ratio of the internal pressure was not sufficiently satisfactory, it still reached the allowable level. The fabric was soft and the adhesiveness against anti-wet heat treatment was excellent. Also, the fabric was deployable at a high speed because the yarn size is as small as 235 dtex.

Example 19

Under the same condition as in Example 1, a finished fabric having the warp density of 146 end/2.54 cm and the weft density of 146 end/2.54 cm was obtained, except that an amount of coated silicone resin was changed to 135 g/m² per one surface. The cover factor in the narrow width hollow weave portion was 2238 on one surface.

Properties of the resultant fabric were shown on Table 1. That is, there were few loom stoppages during the weaving operation which shows that the weavability is favorable. The finished fabric was less in the generation of wrinkles, and the coating irregularity was generally in a tolerable level. The flatness of the boundary was favorable. Also, the retention ratio of the internal pressure was generally satisfactory. The fabric was soft and the adhesiveness against anti-wet heat treatment was excellent. Also, the fabric was deployable at a high speed because the yarn size is as small as 235 dtex.

Example 20

Under the same condition as in Example 1, a finished fabric having the warp density of 146 end/2.54 cm and the weft density of 146 end/2.54 cm was obtained, except that an amount of coated silicone resin was changed to 45 g/m² per one surface. The cover factor in the narrow width hollow weave portion was 2238 on one surface.

Properties of the resultant fabric are shown on Table 1. That is, there was no loom stoppage during the weaving operation which shows that the weavability is favorable. The finished fabric was low in the generation of wrinkles and coating irregularity. The flatness of the boundary was good. Also, the retention ratio of the internal pressure was fully satisfactory. The fabric was soft and the adhesiveness against anti-wet heat treatment was excellent. Also, the fabric was deployable at a high speed because the yarn size is as small as 235 dtex.

Comparative Example 6

Under the same condition as in Example 1, a finished fabric having the warp density of 146 end/2.54 cm and the weft density of 146 end/2.54 cm was obtained, except that an amount of coated silicone resin was changed to 5 g/m² per one surface. The cover factor in the narrow width hollow weave portion was 2238 on one surface.

Properties of the resultant fabric are shown on Table 1. That is, there was no loom stoppage during the weaving operation which shows that the weavability is favorable. The finished fabric was satisfactory in generation of wrinkles and generally satisfactory in coating irregularity. While the flatness of the boundary was favorable, the retention ratio of the internal pressure did not reach the allowable level. The fabric was soft, but the adhesiveness against anti-wet heat treatment did not reach the allowable level. The fabric was deployable at a high speed because the yarn size is as small as 235 dtex.

Example 21

Under the same condition as in Example 1, a finished fabric having the warp density of 146 end/2.54 cm and the weft density of 146 end/2.54 cm was obtained, except that an amount of coated silicone resin was changed to 135 g/m² per one surface. The cover factor in the narrow width hollow weave portion was 2238 on one surface.

Properties of the resultant fabric are shown on Table 1. That is, there was no loom stoppage during the weaving operation which shows that the weavability is favorable. The finished fabric was less in the generation of wrinkles and coating irregularity. While the flatness of the boundary was not fully satisfactory, it still reached the allowable level. Also, the retention ratio of the internal pressure was fully satisfactory. The fabric was soft and the adhesiveness against anti-wet heat treatment was excellent. Also, the fabric was deployable at a high speed because the yarn size is as small as 235 dtex.

Example 22

Under the same condition as in Example 1, a finished fabric having the warp density of 146 end/2.54 cm and the weft density of 145 end/2.54 cm was obtained, except that the fiber fineness of the warp and weft yarns is changed to 2.7 dtex/f, the loom was changed to the air-jet loom, and the warp yarns were applied with a polyacrylate sizing agent of 2% owf. The cover factor in the narrow width hollow weave portion was 2226 on one surface.

Properties of the resultant fabric are shown on Table 1. That is, there were few loom stoppages during the weaving operation which shows that the weavability is favorable. The finished fabric was less in the generation of wrinkles and coating irregularity. The flatness of the boundary was satisfactory. Also, the retention ratio of the internal pressure was fully satisfactory. The fabric was soft and the adhesiveness against anti-wet heat treatment was excellent. Also, the fabric was deployable at a high speed because the yarn size is as small as 235 dtex.

Example 23

Under the same condition as in Example 1, a finished fabric having the warp density of 147 end/2.54 cm and the weft density of 146 end/2.54 cm was obtained, except that the fiber fineness of the warp and weft yarns is changed to 6.5 dtex/f, the loom was changed to the air-jet loom, and the warp yarns were applied with a polyacrylate sizing agent of 2% owf. The cover factor in the narrow width hollow weave portion was 2246 on one surface.

Properties of the resultant fabric are shown on Table 1. That is, there were few loom stoppages during the weaving operation which shows that the weavability is favorable. The finished fabric was less in the generation of wrinkles and coating irregularity. The flatness of the boundary was satisfactory. Also, the retention ratio of the internal pressure was fully satisfactory. The fabric was soft and the adhesiveness against anti-wet heat treatment was excellent. Also, the fabric was deployable at a high speed because the yarn size is as small as 235 dtex.

Example 24

Under the same condition as in Example 1, a finished fabric having the warp density of 143 end/2.54 cm and the weft density of 144 end/2.54 cm was obtained, except that the fiber fineness of the warp and weft yarns is changed to 1.1 dtex/f, the loom was changed to the air-jet loom, and the warp yarns were applied with a polyacrylate sizing agent of 2% owf. The cover factor in the narrow width hollow weave portion was 2200 on one surface.

Properties of the resultant fabric are shown on Table 1. That is, while there was some loom stoppage, the weavability still reached the allowable level. The finished fabric was low in the generation of wrinkles and coating irregularity. The flatness of the boundary was satisfactory. Also, the retention ratio of the internal pressure was satisfactory. The fabric was soft and the adhesiveness against anti-wet heat treatment was excellent. Also, the fabric was deployable at a high speed because the yarn size is as small as 235 dtex.

Example 25

Under the same condition as in Example 1, a finished fabric having the warp density of 148 end/2.54 cm and the weft density of 146 end/2.54 cm was obtained, except that the fiber fineness of the warp and weft yarns is changed to 7.8 dtex/f, the loom was changed to the air-jet loom, and the warp yarns were applied with a polyacrylate sizing agent of 2% owf. The cover factor in the narrow width hollow weave portion was 2254 on one surface.

Properties of the resultant fabric were shown on Table 1. That is, while there were some loom stoppages, the weavability still reached the allowable level. While the finished fabric was not fully satisfactory because of in the occurrences of wrinkles and coating irregularity, but the occurrence wrinkles and coating irregurarity were within an allowable level. The flatness of the boundary was generally satisfactory. Also, the retention ratio of the internal pressure was satisfactory. The fabric was soft and the adhesiveness against anti-wet heat treatment was excellent. Also, the fabric was deployable at a high speed because the yarn size is as small as 235 dtex.

Example 26

A gray fabric was woven from polyhexamethylene adipamide filament yarns having the yarn size of 175 dtex and the fiber fineness of 3.3 dtex used as warp yarns and weft yarns by using the air-jet loom and the electronic jacquard machine described before under the condition wherein a warp density on loom is 146.7 end/2.54 cm, a weft density on loom is 158 end/2.54 cm, a space ratio of the reed is 51.9% and a warp tension during the weaving operation is 0.25 cN/dtex. The warp yarns were applied with a polyacrylate sizing agent of 2% owf. The seam zone was composed of the 2/2 basket weave pattern formed of six yarns, the narrow width hollow weave portion formed of four yarns and the 3/3 basket weave pattern formed of six yarns as seen from the double-layer hollow weave portion side. Then, this gray fabric was subjected to the scouring and setting process, and thereafter subjected to the coating process wherein an amount of 45 g/m$^2$ of silicone resin was coated on both surfaces of the fabric by using a comma coater to result in a finished high-density hollow weave fabric having a warp density of 165 end/2.54 cm, a weft density of 165 end/2.54 cm. The cover factor was 2183 on one surface.

Properties of the resultant fabric are shown on Table 1. That is, there was no loom stoppage during the weaving operation which shows that the weavability is favorable. The finished fabric was free from the generation of wrinkles and coating irregularity. The flatness of the boundary was favorable. Also, the retention ratio of the internal pressure was fully satisfactory. The fabric was soft and the adhesiveness against anti-wet heat treatment was excellent. Also, the fabric was deployable at a high speed because the yarn size is as small as 175 dtex.

Example 27

Under the same condition as in Example 26, a finished high-density hollow weave fabric having the warp density of 206 end/2.54 cm and the weft density of 204 end/2.54 cm was obtained, except that the yarn size of the warp and weft yarns was changed to 110 dtex, the fiber fineness thereof was changed to 3.3 dtex/f, the warp density on loom was changed to 186.7 end/2.54 cm, the weft density on loom was changed to 194 end/2.54 cm, and the space ratio of the reed was changed to 52.2%. The cover factor in the narrow width hollow weave portion was 2150 on one surface.

Properties of the resultant fabric are shown on Table 1. That is, while there were a few loom stoppages during the weaving operation, this shows that the weavability is generally favorable. The finished fabric was less in the generation of wrinkles and coating irregularity. The flatness of the boundary was favorable. Also, the retention ratio of the internal pressure was satisfactory. The fabric was soft and the adhesiveness against anti-wet heat treatment was excellent. Also, the fabric was deployable at a high speed because the yarn size is as small as 110 dtex.

Example 28

Under the same condition as in Example 26, a finished high-density hollow weave fabric having the warp density of 120 end/2.54 cm and the weft density of 114 end/2.54 cm was obtained, except that the yarn size of the warp and weft yarns was changed to 350 dtex, the fiber fineness thereof was changed to 3.3 dtex/f, the warp density on loom was changed to 108.4 end/2.54 cm, the weft density on loom was changed to 108 end/2.54 cm, and the space ratio of the reed was changed to 52.0%. The cover factor in the narrow width hollow weave portion was 2189 on one surface.

Properties of the resultant fabric are shown on Table 1. That is, there was no loom stoppage during the weaving operation, which shows that the weavability is favorable. The finished fabric was less in the generation of wrinkles and coating irregularity. The flatness of the boundary was of satisfactory level. Also, the retention ratio of the internal pressure was satisfactory. The fabric was softness and the adhesiveness against anti-wet heat treatment was excellent. Also, the fabric was deployable at a high speed.

Example 29

Under the same condition as in Example 26, a finished high-density hollow weave fabric having the warp density of 120 end/2.54 cm and the weft density of 114 end/2.54 cm was obtained, except that the yarn size of the warp and weft yarns was changed to 470 dtex, the fiber fineness thereof was changed to 3.3 dtex/f, the warp density on loom was changed to 100.5 end/2.54 cm, the weft density on loom was changed to 93 end/2.54 cm, the space ratio of the reed was changed to 53.8%, and the seam zone was composed of the 2/2 basket weave pattern formed of four yarns, the narrow width hollow weave portion formed of four yarns and the 3/3 basket weave pattern formed of six yarns as seen from the double-layer hollow weave portion side. The cover factor in the narrow width hollow weave portion was 2298 on one surface.

Properties of the resultant fabric are shown on Table 1. That is, there were a few loom stoppages during the weaving operation, which shows that the weavability is favorable. The finished fabric was less in the generation of wrinkles and coating irregularity. The flatness of the boundary was favorable. Also, the retention ratio of the internal pressure was satisfactory. The fabric was soft and the adhesiveness against anti-wet heat treatment was excellent. Also, the fabric was deployable at a high speed.

Example 30

Under the same condition as in Example 26, a finished high-density hollow weave fabric having the warp density of 114 end/2.54 cm and the weft density of 98 end/2.54 cm was obtained, except that the yarn size of the warp and weft yarns was changed to 470 dtex, the fiber fineness thereof was changed to 3.3 dtex/f, and the seam zone was composed of the 2/2 basket weave pattern formed of four yarns, the narrow width hollow weave portion formed of four yarns and the 3/3 basket weave pattern formed of six yarns as seen from the double-layer hollow weave portion side. The cover factor in the narrow width hollow weave portion was 2298 on one surface.

Properties of the resultant fabric were shown on Table 1. That is, there were a few loom stoppages during the weaving operation, which shows that the weavability is favorable. The finished fabric was less in the generation of wrinkles and coating irregularity. The flatness of the boundary was favorable. Also, the retention ratio of the internal pressure was satisfactory. The fabric was soft and the adhesiveness against anti-wet heat treatment was excellent. Also, the fabric was deployable at a high speed.

Comparative Example 7

Under the same condition as in Example 26, a finished high-density hollow weave fabric having the warp density of 250 end/2.54 cm and the weft density of 246 end/2.54 cm was obtained, except that the yarn size of the warp and weft yarns was changed to 78 dtex, the fiber fineness thereof was changed to 3.3 dtex/f, the warp density on loom was changed to 218.2 end/2.54 cm, the weft density on loom was changed to 234 end/2.54 cm, and the space ratio of the reed was changed to 57.0%. The cover factor in the narrow width hollow weave portion was 2191 on one surface.

Properties of the resultant fabric are shown on Table 1. That is, there were many loom stoppages during the weaving operation, which shows that the weavability is not allowable. The finished fabric was generally favorable in the generation of wrinkles and coating irregularity. While the flatness of the boundary was favorable, the retention ratio of the internal pressure was not allowable. While the fabric was soft, the adhesiveness against anti-wet heat treatment was unallowable. The fabric was deployable at a high speed.

Comparative Example 8

Under the same condition as in Example 1, a finished high-density hollow weave fabric having the warp density of 76 end/2.54 cm and the weft density of 71 end/2.54 cm was obtained, except that the yarn size of the warp and weft yarns was changed to 940 dtex, the fiber fineness thereof was changed to 3.3 dtex/f, the warp density on loom was changed to 69.0 end/2.54 cm, the weft density on loom was changed to 68 end/2.54 cm, the space ratio of the reed was changed to 52.5% and the loom was changed to the rapier loom. The cover factor in the narrow width hollow weave portion was 2254 on one surface.

Properties of the resultant fabric are shown on Table 1. That is, there were some loom stoppages during the weaving operation, which shows that the weavability is generally good. The finished fabric was unallowable in the generation of wrinkles and coating irregularity. The flatness of the boundary was unallowable. Although the retention ratio of the internal pressure was insufficient, it barely reached allowable level. While the fabric was soft, the adhesiveness against anti-wet heat treatment was not allowable.

TABLE 1

| | Yarn size (dtex) | Fiber size (dtex) | Weave pattern in boundary area | Warp weave density on loom (end/2.54 cm) | Cover factor of bag body | Weft weaver density on loom (pick/2.54 cm) | Weaving loom | Amount of coating (g/m$^2$) | Warp density in finished fabric (end/2.54 cm) | Weft density in finished fabric (pick/2.54 cm) | Number of stoppage of loom due to warp (times/100 m/loom) | Number of stoppage of loom due to weft (times/100 m/loom) | Wrinkle in finished fabric (class) |
|---|---|---|---|---|---|---|---|---|---|---|---|---|---|
| Example 1 | 235 | 3.3 | 2/2 basket(6) hollow(4) 3/3 baeket(6) | 126.6 | 2238 | 136 | RL | 50 | 146 | 146 | 0 | 0 | 5 |
| Example 2 | 235 | 3.3 | 2/2 basket(6) hollow(4) 3/3 basket(6) | 120 | 2169 | 136 | RL | 50 | 137 | 146 | 0 | 0 | 5 |
| Example 3 | 235 | 3.3 | 2/2 basket(6) hollow(4) 3/3 basket(6) | 147.4 | 2315 | 136 | RL | 50 | 160 | 142 | 1 | 0 | 4.8 |
| Example 4 | 235 | 3.3 | 2/2 basket(6) hollow(4) 3/3 basket(6) | 112.2 | 2093 | 136 | RL | 50 | 127 | 146 | 1 | 1 | 5 |
| Example 5 | 235 | 3.3 | 2/2 basket(6) hollow(4) 3/3 basket(6) | 112.2 | 1970 | 120 | RL | 50 | 128 | 129 | 0 | 0 | 4.8 |
| Com. example 1 | 235 | 3.3 | 2/2 basket(6) hollow(4) 3/3 basket(6) | 108.9 | 1886 | 116 | RL | 80 | 122 | 124 | 0 | 3 | 5 |

TABLE 1-continued

| | Yarn size (dtex) | Fiber size (dtex) | Weave pattern | | | | | | | | | |
|---|---|---|---|---|---|---|---|---|---|---|---|---|
| Com. example 2 | 235 | 3.3 | 2/2 basket(6) 3/3 basket(6) | 157.5 | 2430 | 136 | RL | 80 | 176 | 141 | 52** | 19* | 1.2** |
| Example 6 | 235 | 3.3 | reversible 2/2 basket(4) hollow(4) 3/3 basket(6) | 126.6 | 2238 | 136 | RL | 50 | 146 | 146 | 0 | 0 | 5 |
| Example 7 | 235 | 3.3 | reversible reversible 2/2 basket(4) hollow(4) 3/3 basket(6) | 126.6 | 2238 | 136 | RL | 50 | 146 | 146 | 0 | 0 | 5 |
| Example 8 | 235 | 3.3 | 2/2 basket(4) hollow(4) 3/3 basket(6) | 126.6 | 2238 | 136 | RL | 50 | 146 | 146 | 0 | 1 | 5 |
| Example 9 | 235 | 3.3 | 2/2 basket(16) hollow(4) 3/3 basket(6) | 126.6 | 2246 | 136 | RL | 50 | 147 | 146 | 0 | 2 | 4.2 |
| Example 10 | 235 | 3.3 | 2/2 basket(2) hollow(4) 3/3 basket(6) | 126.6 | 2238 | 136 | RL | 50 | 146 | 146 | 0 | 0 | 5 |
| Example 11 | 235 | 3.3 | 2/2 basket(20) hollow(4) 3/3 basket(6) | 126.6 | 2246 | 136 | RL | 50 | 147 | 146 | 1 | 6 | 4 |
| Example 12 | 235 | 3.3 | 2/2 basket(6) hollow(4) 3/3 basket(3) | 126.6 | 2238 | 136 | RL | 50 | 146 | 146 | 0 | 1 | 5 |
| Example 13 | 235 | 3.3 | 2/2 basket(6) hollow(4) 3/3 basket(15) | 126.6 | 2238 | 136 | RL | 50 | 146 | 146 | 1 | 2 | 4 |
| Com. example 3 | 235 | 3.3 | 2/2 basket(6) only | 126.6 | 2223 | 136 | RL | 50 | 144 | 146 | 0 | 1 | 5 |
| Example 14 | 235 | 3.3 | 2/2 basket(6) hollow (4) 3/3 basket(21) | 126.6 | 2238 | 136 | RL | 50 | 146 | 146 | 2 | 8 | 3.8* |
| Example 15 | 235 | 3.3 | 2/2 basket(6) hollow(40) 3/3 basket(6) | 126.6 | 2238 | 136 | RL | 50 | 146 | 146 | 0 | 2 | 5 |
| Example 16 | 235 | 3.3 | 2/2 basket(6) hollow(52) 3/3 basket(6) | 126.6 | 2230 | 136 | RL | 50 | 145 | 146 | 0 | 1 | 5 |

| | Yarn size (dtex) | Fiber size (dtex) | Weave pattern in boundary area | Coating irregularity (class) | Roughness in boundary area (δ/d) | Retention ratio of bag internal pressure (average) (%) | Retention ratio of bag internal pressure (max to min) (%) | Softness (class) | Retention ratio of bag internal pressure after wet heat treatment (average) (%) | Retention ratio of bag internal pressure after wet heat treatment (min to max) (%) | Overall estimation |
|---|---|---|---|---|---|---|---|---|---|---|---|
| Example 1 | 235 | 3.3 | 2/2 basket(6) hollow (4) 3/3 basket(6) | 4.4 | 0.034 | 90 | 95-87 | 4 | 85 | 91-81 | A |
| Example 2 | 235 | 3.3 | 2/2 basket(6) hollow(4) 3/3 basket(6) | 5 | 0.025 | 90 | 95-85 | 4.2 | 87 | 92-75 | A |
| Example 3 | 235 | 3.3 | 2/2 basket(6) hollow(4) 3/3 basket(6) | 4.8 | 0.039 | 88 | 92-85 | 3.6 | 83 | 88-76 | A |
| Example 4 | 235 | 3.3 | 2/2 basket(6) hollow(4) 3/3 basket(6) | 5 | 0.033 | 80 | 88-71 | 4.2 | 78 | 84-67 | A |
| Example 5 | 235 | 3.3 | 2/2 basket(6) hollow(4) 3/3 basket(6) | 5 | 0.03 | 70 | 76-59 | 4.4 | 69 | 80-58 | A |
| Com. example 1 | 235 | 3.3 | 2/2 basket(6) hollow(4) 3/3 basket(6) | 4 | 0.031 | 24** | 39-12** | 4.4 | 22** | 36-10** | C |
| Com. example 2 | 235 | 3.3 | 2/2 basket(6) hollow(4) 3/3 basket(6) | 1.2** | 0.063* | 44* | 58-27** | 3.8 | 37* | 52-23** | C |
| Example 6 | 235 | 3.3 | reversible 2/2 basket(4) hollow(4) 3/3 basket(6) | 4.4 | 0.033 | 91 | 94-87 | 4 | 86 | 90-81 | A |

TABLE 1-continued

| | Yarn size (dtex) | Fiber size (dtex) | Weave pattern in boundary area | | | | | | | | |
|---|---|---|---|---|---|---|---|---|---|---|---|
| Example 7 | 235 | 3.3 | reversible reversible 2/2 basket(4) hollow(4) 3/3 basket(6) | 4.4 | 0.035 | 92 | 96-88 | 4 | 87 | 91-86 | A |
| Example 8 | 235 | 3.3 | 2/2 basket(4) hollow(4) 3/3 basket(6) | 4.4 | 0.028 | 86 | 92-78 | 4 | 82 | 88-70 | A |
| Example 9 | 235 | 3.3 | 2/2 basket(16) hollow(4) 3/3 basket(6) | 4.2 | 0.039 | 80 | 85-72 | 4 | 78 | 83-69 | A |
| Example 10 | 235 | 3.3 | 2/2 basket(2) hollow (4) 3/3 basket(6) | 5 | 0.027 | 87 | 91-82 | 4 | 85 | 89-72 | A |
| Example 11 | 235 | 3.3 | 2/2basket(20) hollow (4) 3/3 basket(6) | 4 | 0.051* | 75 | 83-66 | 4 | 70 | 77-61 | B |
| Example 12 | 235 | 3.3 | 2/2 basket(6) hollow(4) 3/3 basket(3) | 4.4 | 0.029 | 80 | 86-71 | 4 | 74 | 80-66 | A |
| Example 13 | 235 | 3.3 | 2/2 basket(6) hollow (4) 3/3 basket(15) | 4 | 0.041 | 75 | 82-64 | 4 | 75 | 81-68 | A |
| Com. example 3 | 235 | 3.3 | 2/2 basket(6) only | 4.4 | 0.031 | 34* | 40-18** | 4 | 25** | 31-9** | C |
| Example 14 | 235 | 3.3 | 2/2 basket(6) hollow(4) 3/3 basket(21) | 3.8* | 0.048 | 70 | 81-60 | 4 | 72 | 81-60 | B |
| Example 15 | 235 | 3.3 | 2/2 basket(6) hollow(40) 3/3 basket(6) | 4.2 | 0.037 | 75 | 81-65 | 4 | 73 | 79-59 | A |
| Example 16 | 235 | 3.3 | 2/2 basket(6) hollow(52) 3/3 basket(6) | 4.2 | 0.026 | 66 | 71-54 | 4 | 63 | 71-55 | A |

| | Yarn size (dtex) | Fiber size (dtex) | Weave pattern in boundary area | Warp weave density on loom (end/ 2.54 cm) | Cover factor of bag body | Weft weaver density on loom (pick/ 2.54 cm) | Weaving loom | Amount of coating (g/m²) | Warp density in finished fabric (end/ 2.54 cm) | Weft density in finished fabric (pick/ 2.54 cm) | Number of stoppage of loom due to warp (times/ 100 m/loom) | Number of stoppage of loom due to weft (times/ 100 m/loom) | Wrinkle in finished fabric (class) |
|---|---|---|---|---|---|---|---|---|---|---|---|---|---|
| Example 17 | 235 | 3.3 | 2/2 basket(6) hollow(2) 3/3 basket(6) | 126.6 | 2246 | 136 | RL | 50 | 147 | 146 | 0 | 0 | 5 |
| Com. example 4 | 235 | 3.3 | reversible 2/2 basket(6) | 126.6 | 2246 | 136 | RL | 80 | 147 | 146 | 0 | 2 | 4 |
| Com. example 5 | 235 | 3.3 | 2/2 basket(4) hollow(8) 2/2 basket(4) | 126.6 | 2246 | 136 | RL | 80 | 147 | 146 | 1 | 4 | 4 |
| Example 18 | 235 | 3.3 | 2/2 basket(6) hollow(4) 3/3 basket(6) | 126.6 | 2238 | 136 | RL | 15 | 146 | 146 | 0 | 0 | 5 |
| Example 19 | 235 | 3.3 | 2/2 basket(6) hollow(4) 3/3 basket(6) | 126.6 | 2238 | 136 | RL | 135 | 146 | 146 | 0 | 1 | 5 |
| Example 20 | 235 | 3.3 | 2/2 basket(6) hollow(4) 3/3 basket(6) | 126.6 | 2238 | 136 | RL | 80 | 146 | 146 | 0 | 0 | 5 |
| Com. example 6 | 235 | 3.3 | 2/2 basket(6) hollow(4) 3/3 basket(6) | 126.6 | 2238 | 136 | RL | 5 | 146 | 146 | 0 | 0 | 4.8 |
| Example 21 | 235 | 3.3 | 2/2 basket(6) hollow(4) 3/3 basket(6) | 126.6 | 2238 | 136 | RL | 160 | 146 | 146 | 0 | 0 | 4.4 |
| Example 22 | 235 | 4.4 | 2/2 basket(6) hollow(4) 3/3 basket(6) | 126.6 | 2230 | 136 | AJL | 50 | 146 | 145 | 0 | 1 | 5 |
| Example 23 | 235 | 6.5 | 2/2 basket(6) hollow (4) 3/3 basket(6) | 126.6 | 2246 | 136 | AJL | 50 | 147 | 146 | 0 | 7 | 4 |
| Example 24 | 235 | 1.1 | 2/2 basket(6) hollow (4) 3/3 basket(6) | 126.6 | 2200 | 136 | AJL | 50 | 143 | 144 | 0 | 0 | 5 |
| Example 25 | 235 | 7.8 | 2/2 basket(6) hollow(4) 3/3 basket(6) | 126.6 | 2253 | 136 | AJL | 50 | 148 | 146 | 0 | 27* | 4 |

TABLE 1-continued

| | | | | | | | | | | | | | |
|---|---|---|---|---|---|---|---|---|---|---|---|---|---|
| Example 26 | 175 | 3.3 | 2/2 basket(6) hollow(4) 3/3 basket(6) | 146.7 | 2183 | 158 | AJL | 50 | 165 | 165 | 0 | 0 | 5 |
| Example 27 | 110 | 3.3 | 2/2 basket(6) hollow(4) 3/3 basket(6) | 186.7 | 2150 | 194 | AJL | 50 | 206 | 204 | 0 | 0 | 5 |
| Example 28 | 350 | 3.3 | 2/2 basket(6) hollow (4) 3/3 basket(6) | 108.4 | 2189 | 108 | AJL | 50 | 120 | 114 | 0 | 0 | 5 |
| Example 29 | 470 | 3.3 | 2/2 basket(4) hollow(4) 3/3 basket(6) | 100.5 | 2298 | 93 | AJL | 50 | 114 | 98 | 0 | 0 | 5 |
| Example 30 | 470 | 3.3 | reversible 2/2 basket(4) hollow (4) 3/3 basket(6) | 100.5 | 2298 | 93 | AJL | 50 | 114 | 98 | 0 | 1 | 5 |
| Com. example 7 | 78 | 3.3 | 2/2 basket(6) hollow(4) 3/3 basket(6) | 218.2 | 2190 | 234 | AJL | 50 | 250 | 246 | 0 | 0 | 4.2 |
| Com. example 8 | 940 | 3.3 | 2/2 basket(6) hollow(4) 3/3 basket(6) | 69 | 2253 | 68 | RL | 50 | 76 | 71 | 1 | 0 | 4 |

| | Yarn size (dtex) | Fiber size (dtex) | Weave pattern in boundary area | Coating irregularity (class) | Roughness in boundary area (δ/d) | Retention ratio of bag internal pressure (average) (%) | Retention ratio of bag internal pressure (max to min) (%) | Softness (class) | Retention ratio of bag internal pressure after wet heat treatment (average) (%) | Retention ratio of bag internal pressure after wet heat treatment (min to max) (%) | Overall estimation |
|---|---|---|---|---|---|---|---|---|---|---|---|
| Example 17 | 235 | 3.3 | 2/2 basket(6) hollow(2) 3/3 basket(6) | 4.2 | 0.031 | 89 | 94-79 | 4 | 85 | 90-76 | A |
| Com. example 4 | 235 | 3.3 | reversible 2/2 basket(6) | 4 | 0.04 | 56 | 65-41* | 4 | 35* | 45-22** | C |
| Com. example 5 | 235 | 3.3 | 2/2 basket(4) hollow(8) 2/2 basket(4) | 4 | 0.041 | 64 | 76-46* | 4 | 43* | 56-28** | C |
| Example 18 | 235 | 3.3 | 2/2 basket(6) hollow(4) 3/3 basket(6) | 4 | 0.029 | 63 | 72-44* | 4.4 | 57 | 70-39* | B |
| Example 19 | 235 | 3.3 | 2/2 basket(6) hollow(4) 3/3 basket(6) | 5 | 0.048 | 95 | 97-89 | 3.6 | 92 | 96-84 | A |
| Example 20 | 235 | 3.3 | 2/2 basket(6) hollow(4) 3/3 basket(6) | 5 | 0.022 | 91 | 95-85 | 3.8 | 90 | 94-83 | A |
| Com. example 6 | 235 | 3.3 | 2/2 basket(6) hollow(4) 3/3 basket(6) | 3.4* | 0.047 | 15** | 20-8** | 4.4 | 10** | 17-5** | C |
| Example 21 | 235 | 3.3 | 2/2 basket(6) hollow(4) 3/3 basket(6) | 3* | 0.078* | 93 | 97-88 | 3.2 | 86 | 91-82 | B |
| Example 22 | 235 | 4.4 | 2/2 basket(6) hollow (4) 3/3 basket(6) | 5 | 0.03 | 90 | 95-83 | 4 | 86 | 93-77 | A |
| Example 23 | 235 | 6.5 | 2/2 basket(6) hollow(4) 3/3 basket(6) | 4 | 0.045 | 77 | 81-65 | 4 | 73 | 79-58 | A |
| Example 24 | 235 | 1.1 | 2/2 basket(6) hollow(4) 3/3 basket(6) | 5 | 0.022 | 89 | 93-83 | 4.4 | 86 | 90-79 | A |
| Example 25 | 235 | 7.8 | 2/2 basket(6) hollow (4) 3/3 basket(6) | 4 | 0.059* | 75 | 81-65 | 3.8 | 70 | 80-60 | B |
| Example 26 | 175 | 3.3 | 2/2 basket(6) hollow(4) 3/3 basket(6) | 5 | 0.021 | 89 | 93-83 | 4.4 | 83 | 91-77 | A |
| Example 27 | 110 | 3.3 | 2/2 basket(6) hollow(4) 3/3 basket(6) | 5 | 0.036 | 82 | 89-74 | 5 | 76 | 88-69 | A |
| Example 28 | 350 | 3.3 | 2/2 basket(6) hollow(4) 3/3 basket(6) | 5 | 0.038 | 88 | 92-79 | 4 | 82 | 87-70 | A |

TABLE 1-continued

| | | | | | | | | | | | |
|---|---|---|---|---|---|---|---|---|---|---|---|
| Example 29 | 470 | 3.3 | 2/2 basket(4) hollow(4) 3/3 basket(6) | 5 | 0.044 | 89 | 93-84 | 3 | 84 | 89-73 | A |
| Example 30 | 470 | 3.3 | reversible 2/2 basket(4) hollow(4) 3/3 basket(6) | 5 | 0.042 | 90 | 93-87 | 3 | 86 | 92-75 | A |
| Com. example 7 | 78 | 3.3 | 2/2 basket(6) hollow(4) 3/3 basket(6) | 4.2 | 0.04 | 15** | 50-0** | 5 | 12** | 40-0** | C |
| Com. example 8 | 940 | 3.3 | 2/2 basket(6) hollow(4) 3/3 basket(6) | 2** | 0.097* | 56 | 67-36* | 2* | 49* | 60-25** | C |

Note:
a mark * shows that the value is not fully satisfactory but reaches the allowable level, and a mark ** shows that the value is problematic.

CAPABILITY OF EXPLOITATION IN INDUSTRY

According to the present invention, it is possible to provide a high-density hollow weave fabric suitable for an air bag excellent in retention ratio of the internal pressure and in weavability as well as low in the generation of wrinkles and coating irregularity. Particularly, the inventive fabric is favorably used for a curtain-shaped air bag.

What is claimed is:

1. A high-density hollow weave fabric comprising a deployable/inflatable double-layer bag portion, a seam zone provided on the outer periphery of the bag portion, and a non-deployable/inflatable portion, which portions are formed of thermoplastic synthetic fiber yarns of a yarn size in a range from 100 dtex to 500 dtex, wherein at least part of the seam zone comprises a first weave portion of a 2/2 basket weave pattern, a narrow width hollow weave portion and a second weave portion of a 3/3 basket weave pattern in this order as seen from the bag portion side, and the high-density hollow weave fabric has a silicone resin coating layer of 10 g/m$^2$ or more.

2. The high-density hollow weave fabric as defined by claim 1, wherein the first weave portion is composed of at least one reversible figured weave pattern and a 2/2 basket weave pattern.

3. The high-density hollow weave fabric as defined by claim 1, wherein a cover factor of the narrow width hollow weave portion is in a range from 1900 to 2400 per one surface, and the number of yarns is in a range from 20 ends to 40 ends.

4. The high-density hollow weave fabric as defined claim 1, wherein the number of yarns in the 2/2 basket weave pattern is in a range from 4 ends to 16 ends.

5. The high-density hollow weave fabric as defined by claim 1, wherein the number of yarns in the 3/3 basket weave pattern is in a range from 3 ends to 15 ends.

6. The high-density hollow weave fabric as defined by claim 1, wherein a yarn size of the thermoplastic synthetic fiber yarn is 400 dtex or less.

7. The high-density hollow weave fabric as defined by claim 1, wherein a yarn size of the thermoplastic synthetic fiber yarn is 250 dtex or less.

8. The high-density hollow weave fabric as defined by claim 1, wherein the thermoplastic synthetic fiber yarn is a filament of polyhexamethylene adipamide.

9. The high-density hollow weave fabric as defined by claim 1, wherein the first weave portion comprises a series of 2 to 6 reversible figured weave patterns.

10. The high-density hollow weave fabric as defined by claim 1, wherein at least part of the non-inflatable hollow weave portion has a partially knotted section.

11. The high-density hollow weave fabric as defined by claim 1, wherein the high-density hollow weave fabric has a silicone coating layer of 140 g/m$^2$ or less.

12. The high-density hollow weave fabric as defined by claim 1, wherein a fiber size of the synthetic fiber is in a range from 0.5 dtex to 4.5 dtex.

13. The high-density hollow weave fabric as defined by claim 1, wherein the high-density hollow weave fabric has a silicone coating layer of 50 g/m$^2$ or less.

14. A curtain-shaped air bag formed of a high-density hollow weave fabric as defined by claim 1.

15. A curtain-shaped air bag formed of polyhexamethylene adipamide fiber and coated with silicone resin of 10 g/m$^2$ to 140 g/m$^2$, wherein an inferior pressure retention ratio after inflation is 70% or more.

16. The curtain-shaped air bag as defined by claim 14, wherein the air bag is coated with silicone resin of 50 g/m$^2$ or less and has a seam zone of a reversible figured weave pattern and a basket weave pattern.

* * * * *